(12) United States Patent
Kawada

(10) Patent No.: US 12,267,632 B2
(45) Date of Patent: Apr. 1, 2025

(54) METHOD OF CONTROLLING PROJECTOR, PROJECTOR, AND NON-TRANSITORY COMPUTER-READABLE STORAGE MEDIUM STORING PROGRAM

(71) Applicant: SEIKO EPSON CORPORATION, Tokyo (JP)

(72) Inventor: Kenji Kawada, Hiji-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/386,851

(22) Filed: Nov. 3, 2023

(65) Prior Publication Data

US 2024/0155089 A1 May 9, 2024

(30) Foreign Application Priority Data

Nov. 4, 2022 (JP) ................................. 2022-177590

(51) Int. Cl.
*H04N 9/31* (2006.01)
(52) U.S. Cl.
CPC ................................. *H04N 9/3147* (2013.01)
(58) Field of Classification Search
CPC .. H04N 9/3155; H04N 9/3182; H04N 9/3194; H04N 9/3147; H04N 9/31; H04N 9/312; G03B 21/2053; G03B 21/206

USPC .......................... 348/744; 353/34, 48, 89, 94
See application file for complete search history.

(56) References Cited

U.S. PATENT DOCUMENTS

2019/0199984 A1* 6/2019 Sato ..................... H04N 9/3147
2021/0136339 A1   5/2021 Kashiwagi et al.

FOREIGN PATENT DOCUMENTS

| JP | 2010-134070 A | 6/2010 |
| JP | 2014-002343 A | 1/2014 |
| JP | 2014-066805 A | 4/2014 |
| JP | 2021-071609 A | 5/2021 |

* cited by examiner

*Primary Examiner* — Sherrie Hsia
(74) *Attorney, Agent, or Firm* — Oliff PLC

(57) ABSTRACT

A method of controlling a projector includes performing tiling projection in a first area and a second area by a first projector and a first projector group projecting image light beams in the first area and the second projector group projecting image light beams in the second area, performing first adjustment processing of applying a second adjustment amount smaller than a first adjustment amount to the first projector group and projecting the image light beams when projection by the first projector stops and first processing is selected, and performing second adjustment processing of applying a third adjustment amount no larger than a difference between the first adjustment amount and the second adjustment amount to the first projector group after the first adjustment processing, and projecting the image light beams.

10 Claims, 8 Drawing Sheets

METHOD OF CONTROLLING PROJECTOR, PROJECTOR, AND NON-TRANSITORY COMPUTER-READABLE STORAGE MEDIUM STORING PROGRAM

The present application is based on, and claims priority from JP Application Serial Number 2022-177590, filed Nov. 4, 2022, the disclosure of which is hereby incorporated by reference herein in its entirety.

BACKGROUND

1. Technical Field

The present disclosure relates to a method of controlling a projector, a projector, and a non-transitory computer-readable storage medium storing a program.

2. Related Art

In the past, there has been known a technology related to stack projection and tiling projection of a plurality of projectors (see, e.g., JP-A-2021-71609 (Document 1)).

In Document 1, there is disclosed the following technology. That is, in a projection system constituted by a plurality of projector groups, there are a first projector group for displaying a first combined image in a first area of a display surface in a stacked manner, and a second projector group for displaying a second combined image in a second area of the display surface in a stacked manner. A part of the first area overlaps a part of the second area, and the first projector group and the second projector group perform the tiling projection. The luminance of the first projector group and the luminance of the second projector group are each adjusted so that the luminance of the first area and the luminance of the second area approximate to each other.

In Document 1, there is described the point that the control is performed so as to approximate the luminance of an entire area including both of the first area in which the projection is performed by a plurality of projectors and the second area in which the projection is performed by another plurality of projectors between the case of performing the stack projection and the case of performing the tiling projection. When one of the projectors in the projector group cannot perform the projection due to a failure or the like, it is necessary to execute processing of adjusting the luminance. However, there is a possibility that the user recognizes the luminance variation of the projection surface caused during the execution of the processing of adjusting the luminance to cause a feeling of strangeness.

SUMMARY

An aspect of the present disclosure is a method of controlling a projector including performing tiling projection in a first area and a second area of a projection surface by projecting image light beams in the first area by a first projector and a first projector group including one or more projectors, and projecting image light beams in the second area by a second projector group including two or more projectors, selecting either one of first processing of adjusting luminance of a light source of the first projector group in two or more times in a first period based on at least one of a luminance variation of an input image and peripheral luminance of the projection surface and second processing of adjusting the luminance of the light source of the first projector group at a time in a second period shorter than the first period when projection by the first projector stops, deciding a first adjustment amount of adjusting output of the light source of the first projector group so that luminance of the first area in which the image light beams of the first projector group are projected coincides with luminance of the second area in which the image light beams of the second projector group are projected when the projection by the first projector stops, performing first adjustment processing of applying a second adjustment amount smaller than the first adjustment amount to the first projector group when the first processing is selected, projecting, by the first projector group, the image light beams after the first adjustment processing, performing second adjustment processing of applying a third adjustment amount which is no larger than a difference between the first adjustment amount and the second adjustment amount to the first projector group after the projecting the image light beams by the first projector group, and projecting, by the first projector group, the image light beams after performing the second adjustment processing.

Another aspect of the present disclosure is a non-transitory computer-readable storage medium storing a program configured to make a processor of a projector execute performing tiling projection in a first area and a second area of a projection surface by projecting image light beams in the first area by a first projector and a first projector group including one or more projectors, and projecting image light beams in the second area by a second projector group including two or more projectors, selecting either one of first processing of adjusting luminance of a light source of the first projector group in two or more times in a first period based on at least one of a luminance variation of an input image and peripheral luminance of the projection surface and second processing of adjusting the luminance of the light source of the first projector group at a time in a second period shorter than the first period when projection by the first projector stops, deciding a first adjustment amount of adjusting output of the light source of the first projector group so that luminance of the first area in which the image light beams of the first projector group are projected coincides with luminance of the second area in which the image light beams of the second projector group are projected when the projection by the first projector stops, performing first adjustment processing of applying a second adjustment amount smaller than the first adjustment amount to the first projector group when the first processing is selected, projecting, by the first projector group, the image light beams after performing the first adjustment processing, performing second adjustment processing of applying a third adjustment amount which is no larger than a difference between the first adjustment amount and the second adjustment amount to the first projector group after the projecting the image light beams by the first projector group, and projecting, by the first projector group, the image light beams after performing the second adjustment processing.

Still another aspect of the present disclosure is a projector including a light source, a memory, and at least one processor, wherein the at least one processor is configured to execute performing tiling projection in a first area and a second area of a projection surface by projecting image light beams in the first area by a first projector and a first projector group including one or more projectors, and projecting image light beams in the second area by a second projector group including two or more projectors, selecting either one of first processing of adjusting luminance of a light source of the first projector group in two or more times in a first period based on at least one of a luminance variation of an input image and peripheral luminance of the projection surface and second processing of adjusting the luminance of the light source of the first projector group at a time in a second period shorter than the first period when projection by the first projector stops, deciding a first adjustment amount of adjusting output of the light source of the first projector group so that luminance of the first area in which the image light beams of the first projector group are projected coincides with luminance of the second area in which the image light beams of the second projector group are projected when the projection by the first projector stops, performing first adjustment processing of applying a second adjustment amount smaller than the first adjustment amount to the first projector group when the first processing is selected, projecting, by the first projector group, the image light beams after performing the first adjustment processing, performing second adjustment processing of applying a third adjustment amount which is no larger than a difference between the first adjustment amount and the second adjustment amount to the first projector group after the projecting the image light beams by the first projector group, and projecting, by the first projector group, the image light beams after performing the second adjustment processing, and the projector is included in either one of the first projector group and the second projector group.

DESCRIPTION OF AN EXEMPLARY EMBODIMENT

An embodiment will hereinafter be described with reference to the drawings.

Figure 1:
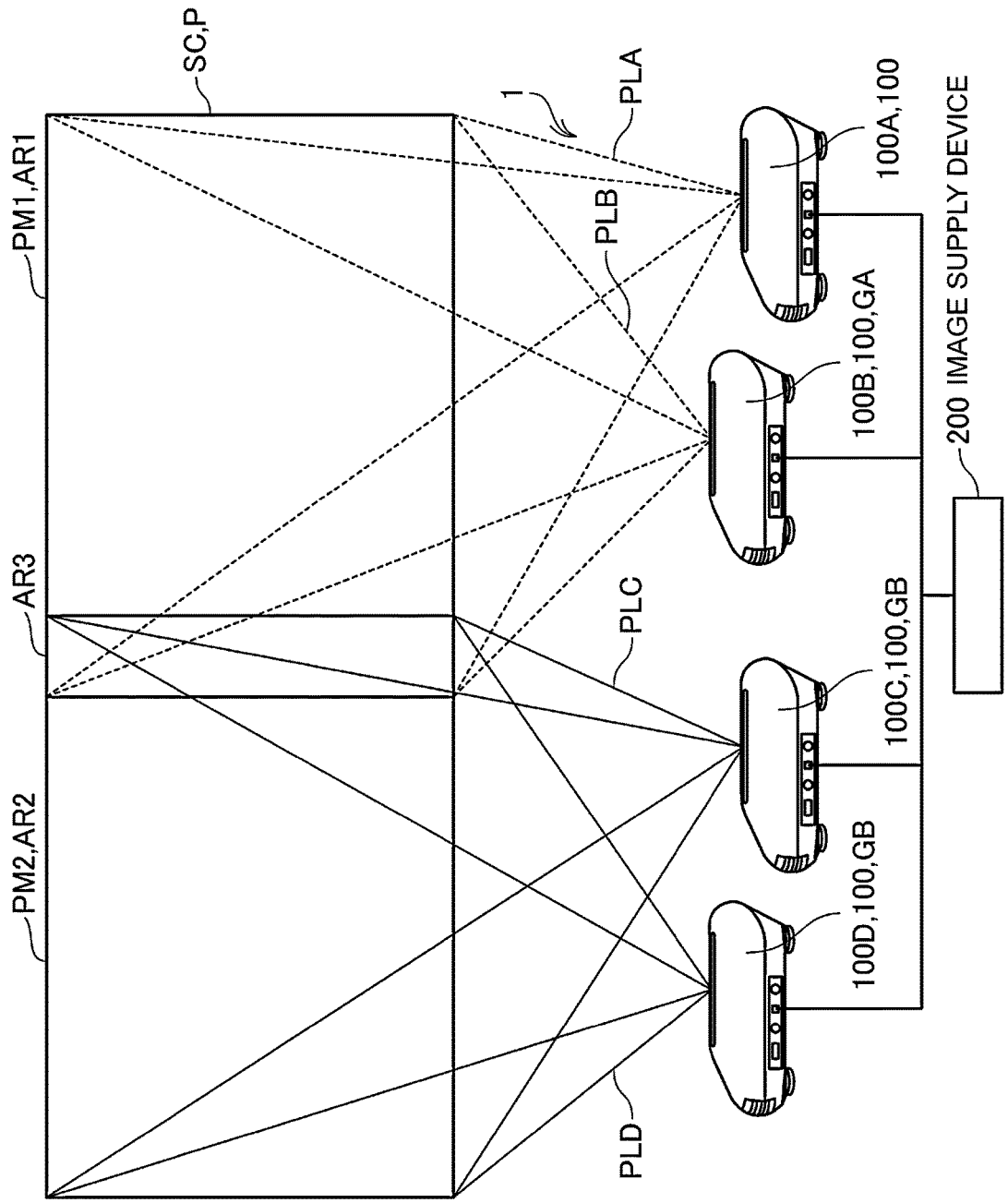
FIG. 1 is a diagram showing an example of an image projection system according to an embodiment.

FIG. 1 is a diagram showing an example of a configuration of an image projection system. 1 according to the present embodiment.

The image projection system 1 is provided with projectors 100 and an image supply device 200. The projectors 100 include a first projector 100A, a second projector 100B, a third projector 100C, and a fourth projector 100D.

The second projector 100B corresponds to an example of a "first projector group." In the following description, the second projector 100B is described as a first projector group GA in some cases for the sake of convenience.

The third projector 100C and the fourth projector 100D correspond to an example of a "second projector group." In the following description, the third projector 100C and the fourth projector 100D are described as a second projector group GB in some cases.

Further, the first projector 100A through the fourth projector 100D are connected to each other so as to be able to communicate with each other. The first projector 100A through the fourth projector 100D are connected to each other so as to be able to communicate with each other via, for example, an Ethernet (a registered trademark) cable.

The first projector 100A through the fourth projector 100D are connected to each other so as to be able to perform wire communication with each other with the Ethernet (the registered trademark) cable or the like in the present embodiment, but can be connected to each other so as to be able to perform wireless communication with each other with Wi-Fi (a registered trademark) or the like.

The image supply device 200 is formed of, for example, a personal computer, and supplies an image to each of the first projector 100A through the fourth projector 100D. The image supply device 200 supplies the image generated by reproducing, for example, a content to each of the first projector 100A through the fourth projector 100D via the Ethernet (the registered trademark) cable.

The image supply device 200 is connected to the first projector 100A through the fourth projector 100D so as to be able to perform the wire communication with each other with the Ethernet (the registered trademark) cable or the like in the present embodiment, but can be connected thereto so as to be able to perform the wireless communication with Wi-Fi (the registered trademark) or the like.

The image supply device 200 is formed of the personal computer in the present embodiment, but can be formed of a tablet terminal, a smartphone, or the like.

The first projector 100A through the fourth projector 100D are arranged in, for example, a horizontal direction of FIG. 1. In other words, the first projector 100A through the fourth projector 100D are arranged along a direction parallel to a screen SC.

The first projector 100A projects a first image light beam PLA in a first area AR1 of the screen SC. The second projector 100B projects a second image light beam PLB in the first area AR1 of the screen SC. The third projector 100C projects a third image light beam PLC in a second area AR2 of the screen SC. The fourth projector 100D projects a fourth image light beam PLD in the second area AR2 of the screen SC.

Further, the first projector 100A and the second projector 100B project the first image light beam PLA and the second image light beam PLB so as to form a first image PM1 on the screen SC. The third projector 100C and the fourth projector 100D project the third image light beam PLC and the fourth image light beam PLD so as to form a second image PM2 on the screen SC. As shown in FIG. 1, the first image PM1 and the second image PM2 are arranged in the horizontal direction. The first image PM1 and the second image PM2 form a single projection image P.

The screen SC corresponds to an example of a "projection surface."

The third area AR3 is an area where the first area AR1 and the second area AR2 overlap each other, and is an area where the first image PM1 and the second image PM2 are superimposed on each other. On the first image light beam PLA through the fourth image light beam PLD to be projected in the third area AR3, there is performed so-called edge blending processing, and the first image PM1 and the second image PM2 are smoothly connected to each other.

In the following explanation, the description of image light beam PL is used in some cases when the first image light beam PLA through the fourth image light beam PLD are not distinguished from each other.

In the present embodiment, the first projector 100A and the second projector 100B perform so-called stacking display of the first image PM1, and the third projector 100C and the fourth projector 100D perform so-called stacking display of the second image PM2. Further, the first projector 100A through the fourth projector 100D perform so-called tiling display of the first image PM1 and the second image PM2. The stacking display means that, for example, a plurality of projectors projects the same image in a superimposed manner to thereby display that image brighter than when displaying that image with a single projector. The tiling display means that, for example, images are projected side by side using a plurality of projectors to thereby display a larger image than the image displayed with a single projector.

Further, in the present embodiment, for example, the fourth projector 100D functions as a primary projector, and the first projector 100A through the third projector 100C function as secondary projectors. The fourth projector 100D controls an operation of each of the first projector 100A through the third projector 100C. Specifically, as described with reference to FIG. 3, the fourth projector 100D controls output of a light source 111A of each of the first projector 100A through the third projector 100C.

The light source 111A will further be described with reference to FIG. 2.

Figure 2:
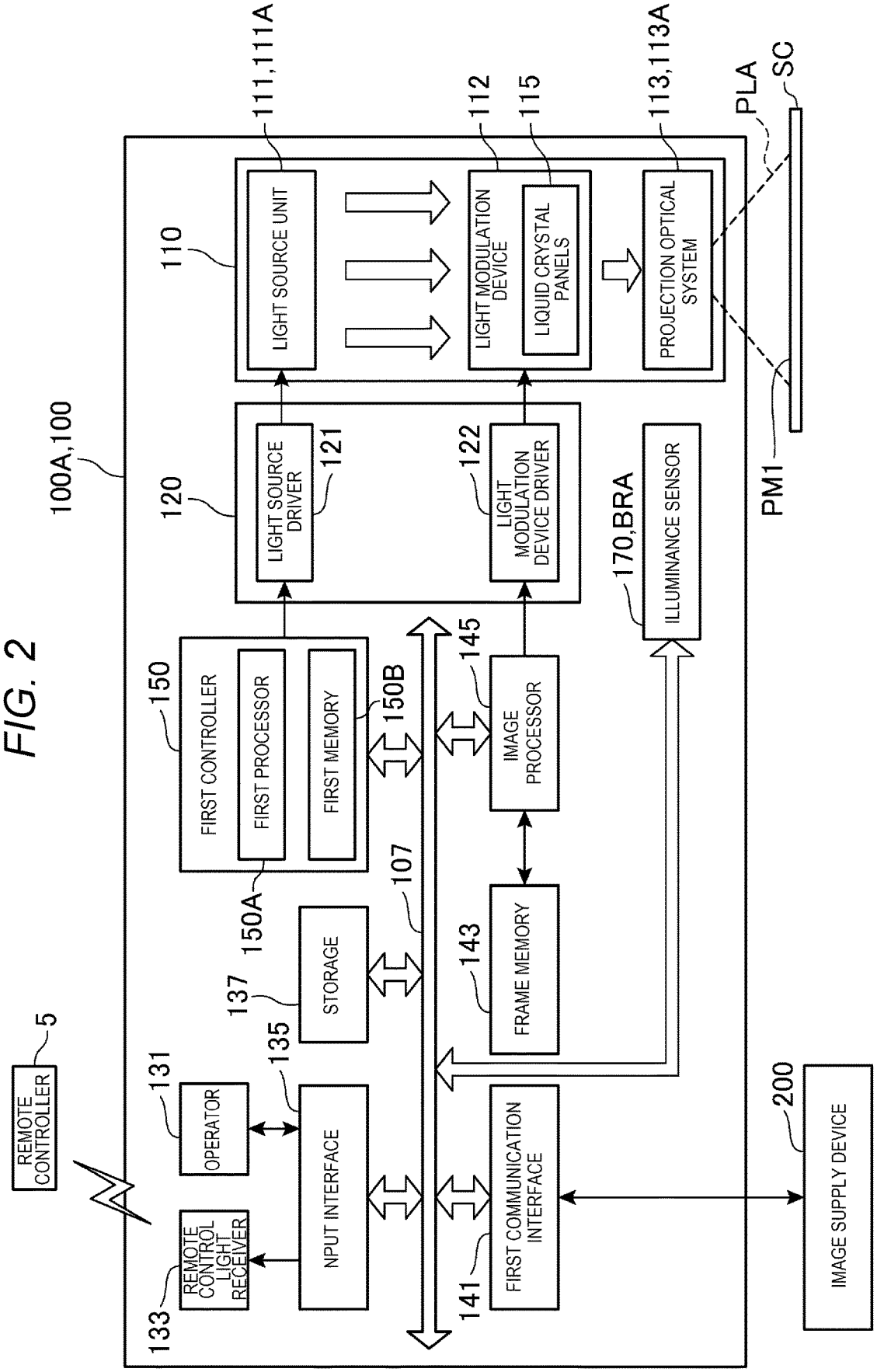
FIG. 2 is a diagram showing an example of a configuration of a projector according to the embodiment.

FIG. 2 is a diagram showing an example of a configuration of the projector 100 according to the present embodiment.

Since the first projector 100A through the fourth projector 100D have respective configurations substantially the same as each other, the configuration of the first projector 100A will be described with reference to FIG. 2, and the description of the configurations of the second projector 100B through the fourth projector 100D will be omitted. It should be noted that in the following description, the first projector 100A through the fourth projector 100D are each described as the projector 100 when the first projector 100A through the fourth projector 100D are not distinguished from each other.

As shown in FIG. 2, the first projector 100A is provided with a projection unit 110 and a driver 120 for driving the projection unit 110. The projection unit 110 forms an optical image to project the first image light beam PLA on the screen SC. It should be noted that in the present embodiment, the projection unit 110 projects the first projection image PLA corresponding to image data from the image supply device 200 on the screen SC.

The projection unit 110 is provided with a light source unit 111, a light modulation device 112, and a projection optical system 113. The driver 120 is provided with a light source driver 121 and a light modulation device driver 122.

The light source unit 111 is provided with a solid-state light source 111A such as an LED (Light Emitting Diode) or a laser source.

The solid-state light source 111A corresponds to an example of a "light source."

In the present embodiment, there is described when the light source unit 111 is provided with the solid-state light source 111A, but this is not a limitation. It is possible for the light source unit 111 to be provided with a lamp light source such as a halogen lamp, a xenon lamp, or an extra high pressure mercury lamp instead of the solid-state light source 111A.

In the following description, the solid-state light source 111A is described as the light source 111A in some cases.

Further, the light source unit 111 can also be provided with a reflector and an auxiliary reflector for guiding the light emitted by the light source 111A to the light modulation device 112. Further, the light source unit 111 can also be provided with a lens group for improving the optical characteristics of the projection light, a polarization plate, a dimming element for reducing the light intensity of the light emitted by the light source 111A on a path leading to the light modulation device 112, or the like.

The light source driver 121 is coupled to an internal bus 107, and puts the light source 111A of the light source unit 111 on and off in accordance with an instruction of a first controller 150 coupled likewise to the internal bus 107. In the present embodiment, the light source driver 121 controls the output of the light source 111A in accordance with the instructions of a first processing unit 155 and a second processing unit 156 of the fourth projector 100D described with reference to FIG. 3.

The light modulation device 112 is provided with three liquid crystal panels 115 corresponding respectively to, for example, the three primary colors of R, G, and B. The character R represents red, the character G represents green, and the character B represents blue. In other words, the light modulation device 112 is provided with the liquid crystal panel 115 corresponding to an R colored light beam, the liquid crystal panel 115 corresponding to a G colored light beam, and the liquid crystal panel 115 corresponding to a B colored light beam.

The light emitted by the light source unit 111 is separated into colored light beams of the three colors of RGB, and the colored light beams respectively enter the corresponding liquid crystal panels 115. The three liquid crystal panels 115 are each a transmissive liquid crystal panel, and each modulate the light transmitted therethrough to generate the first image light beam PLA. The first image light beams PLA having been modulated while passing through the respective liquid crystal panels 115 are combined with each other by a combining optical system such as a cross dichroic prism, and are then emitted to the projection optical system 113.

When the light modulation device 112 is provided with the liquid crystal panels 115 of the transmissive type as the light modulation elements will be described in the present embodiment, but this is not a limitation. The light modulation element can be a reflective liquid crystal panel, or can also be a digital micromirror device (Digital Micromirror Device).

The light modulation device 112 is driven by the light modulation device driver 122. The light modulation device driver 122 is coupled to an image processor 145.

To the light modulation device driver 122, there is input image data corresponding to the respective primary colors of R, G, and B from the image processor 145. The light modulation device driver 122 converts the image data input thereto into data signals suitable for the operations of the liquid crystal panels 115. The light modulation device driver 122 applies a voltage to each pixel of each of the liquid crystal panels 115 based on the data signal thus converted to thereby draw an image on each of the liquid crystal panels 115.

The projection optical system 113 is provided with a projection lens, a mirror, or the like for focusing the image light beam PLA having entered the projection optical system 113 on the screen SC. Further, the projection optical system 113 is provided with a zoom mechanism for expanding or contracting the image to be projected on the screen SC, a focus adjustment mechanism for performing a focus adjustment, a lens shift mechanism for adjusting a projection direction of the image light beam PLA, and so on.

Further, the first projector 100A is provided with an illuminance sensor 170. The illuminance sensor 170 detects the luminance around the first projector 100A. The illuminance sensor 170 is arranged at, for example, an opposite side to the side on which the image light beam PLA is projected in a chassis of the first projector 100A. In this case, the illuminance sensor 170 can suppress an influence of the image light beam PLA to the illuminance to be detected.

The illuminance sensor 170 transmits a signal representing first illuminance BRA thus detected to the first controller 150. The first controller 150 transmits the first illuminance BRA detected by the illuminance sensor 170 to the fourth projector 100D via a first communication interface 141.

The first projector 100A is further provided with an operator 131, a remote control light receiver 133, an input interface 135, a storage 137, the first communication interface 141, a frame memory 143, the image processor 145, and the first controller 150. The input interface 135, the storage 137, the first communication interface 141, the image processor 145, the first controller 150, and the illuminance sensor 170 are connected to each other so as to be able to achieve data communication with each other via the internal bus 107.

The operator 131 is provided with a variety of buttons and switches disposed on a surface of the chassis of the first projector 100A, and generates an operation signal corresponding to an operation to these buttons and switches to output the operation signal to the input interface 135. The input interface 135 is provided with a circuit for outputting the operation signal input from the operator 131 to the first controller 150.

The remote control light receiver 133 receives an infrared signal transmitted from a remote controller 5, and then decodes the infrared signal thus received to generate the operation signal. The remote control light receiver 133 outputs the operation signal thus generated to the input interface 135. The input interface 135 is provided with a circuit for outputting the operation signal input from the remote control light receiver 133 to the first controller 150.

The storage 137 is a magnetic recording device such as an HDD (Hard Disk Drive), or a storage device using a semiconductor storage element such as a flash memory or an SSD (Solid State Drive). The storage 137 stores a program to be executed by the first controller 150, data having been processed by the first controller 150, the image data, and so on.

The first communication interface 141 is a communication interface for executing communication with the image supply device 200 and the second projector 100B through the fourth projector 100D in compliance with the Ethernet (the registered trademark) standard. The first communication interface 141 is provided with a connector to which the Ethernet (the registered trademark) cable is coupled, and an interface circuit for processing a signal transmitted through the connector. The first communication interface 141 is an interface board having the connector and the interface circuit, and is coupled to a main board on which a first processor 150A and so on of the first controller 150 are mounted. Alternatively, the connector and the interface circuit constituting the first communication interface 141 are mounted on the main board of the first controller 150. The first communication interface 141 receives the image data and so on from the image supply device 200. Further, the first communication interface 141 transmits first illuminance BRA detected by the illuminance sensor 170 to the fourth projector 100D, and receives instruction information of the output of the light source 111A from the fourth projector 100D.

The first controller 150 is provided with a first memory 150B and the first processor 150A. The first memory 150B is a storage device for storing programs to be executed by the first processor 150A and data in a nonvolatile manner. The first memory 150B is formed of a magnetic storage device, a semiconductor storage element such as a flash ROM (Read Only Memory), or a nonvolatile storage device of other types. Further, the first memory 150B can also include a RAM (Random Access Memory) constituting a work area for the first processor 150A. The first memory 150B stores data to be processed by the first controller 150, and a first control program PGM1 or the like to be executed by the first processor 150A.

The first processor 150A can be constituted by a single processor, or it is also possible to adopt a configuration in which a plurality of processors functions as the first processor 150A. The first processor 150A executes the first control program PGM1 to control each part of the first projector 100A. For example, an execution instruction of the image processing corresponding to the operation received by the operator 131 or the remote controller 5, and parameters to be used in the image processing are output by the first processor 150A to the image processor 145. The parameters include, for example, geometric correction parameters for correcting a geometric distortion of the image to be projected on the screen SC. Further, the first processor 150A controls the light source driver 121 to control lighting and extinction of the light source unit 111, and to adjust the output, namely the light intensity, of the light source unit 111.

The first processor 150A corresponds to an example of "at least one processor." The first memory 150B corresponds to an example of a "memory."

The first control program PGM1 corresponds to an example of a "program."

The first processor 150A can also be formed of an SoC (system on Chip) integrated with a part or the whole of the first memory 150B and other circuits. Further, the first processor 150A can also be formed of a combination of a CPU (Central Processing Unit) for executing the program and a DSP (Digital Signal Processor) for executing predetermined arithmetic processing. It is also possible to adopt a configuration in which all of the functions of the first processor 150A are implemented in the hardware, or it is also possible to configure all of the functions of the first processor 150A using a programmable device.

The image processor 145 and the frame memory 143 can be formed of, for example, an integrated circuit. The integrated circuit includes an LSI Large-Scale Integration), an ASIC (Application Specific Integrated Circuit), and a PLD (Programmable Logic Device). The PLD includes, for example, an FPGA (Field-Programmable Gate Array). Further, it is also possible for an analog circuit to be included as a part of a configuration of the integrated circuit, or it is also possible to adopt a combination of the processor and the integrated circuit. The combination of the processor and the integrated circuit is called a micro-controller (MCU), an SoC (System-on-a-chip), a system LSI, a chip set, and so on.

The image processor 145 develops the image data input from the first communication interface 141 to the image processor 145 in the frame memory 143. The frame memory 143 is provided with a plurality of banks. Each of the banks has a storage capacity sufficient for the image data corresponding to one frame to be written therein. The frame memory 143 is formed of, for example, an SDRAM (Synchronous Dynamic Random Access Memory).

The image processor 145 performs image processing such as resolution conversion processing, resizing processing, a correction of a distortion aberration, shape correction processing, digital zoom processing, and an adjustment of tint and luminance of the image on the image data developed in the frame memory 143.

Further, the image processor 145 converts an input frame frequency of a vertical sync signal into a drawing frequency to generate a vertical sync signal. The vertical sync signal thus generated is referred to as an output sync signal. The image processor 145 outputs the output sync signal thus generated to the light modulation device driver 122.

Figure 3:
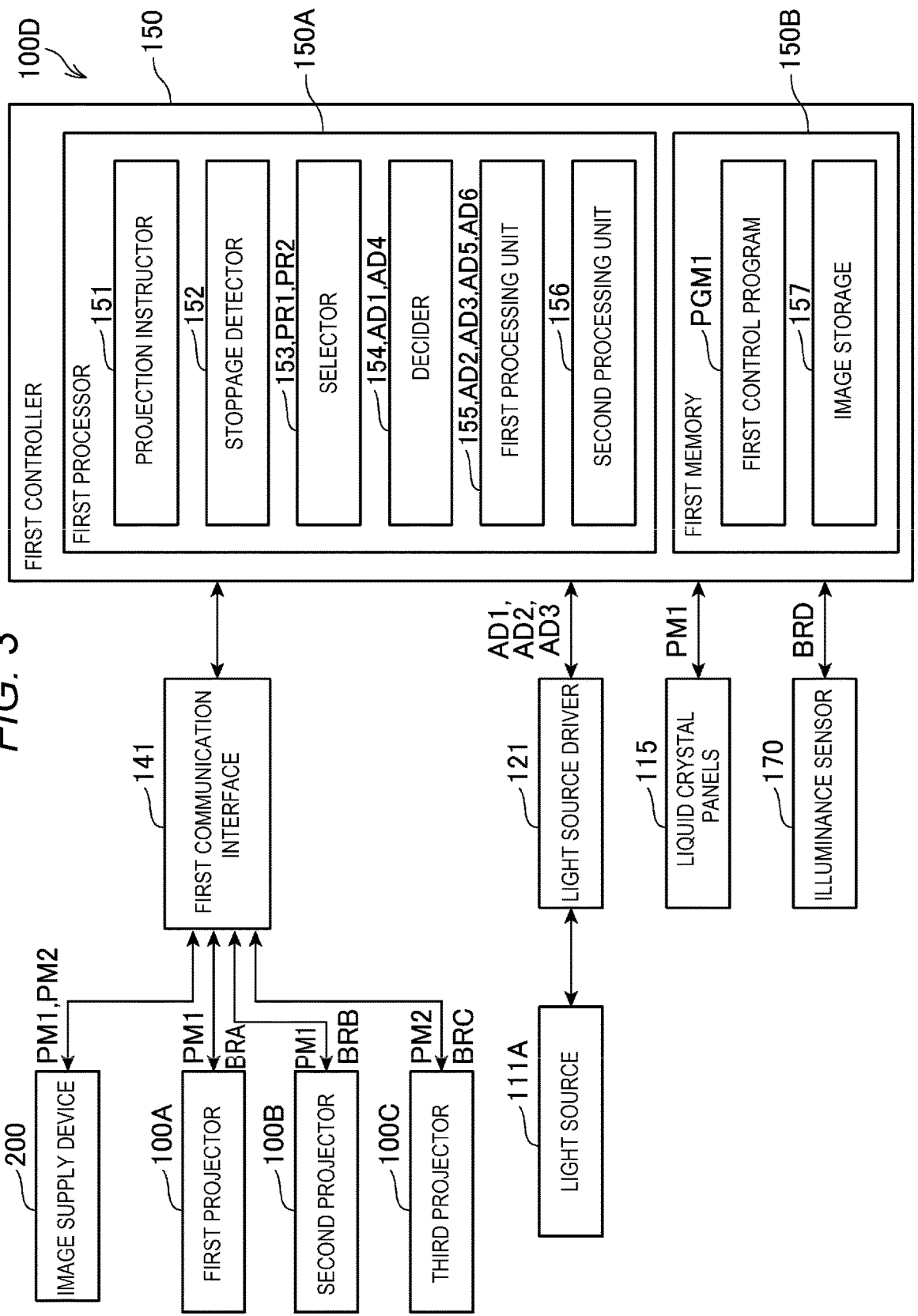
FIG. 3 is a diagram showing an example of a configuration of a first controller of a fourth projector.

Then, a configuration of the first controller 150 of the fourth projector 100D will be described with reference to FIG. 3. FIG. 3 is a diagram showing an example of the configuration of the first controller 150 of the fourth projector 100D. The first controller 150 of the fourth projector 100D instructs the output of the light sources 111A of the first projector 100A through the third projector 100C, and at the same time, controls the operation of the fourth projector 100D.

As shown in FIG. 3, the first controller 150 is provided with a projection instructor 151, a stoppage detector 152, a selector 153, a decider 154, the first processing unit 155, the second processing unit 156, and an image storage 157. Specifically, the first processor 150A of the first controller 150 executes the first control program PGM1 stored in the first memory 150B to thereby function as the projection instructor 151, the stoppage detector 152, the selector 153, the decider 154, the first processing unit 155, and the second processing unit 156. Further, the first processor 150A of the first controller 150 executes the first control program PGM1 stored in the first memory 150B to thereby make the first memory 150B function as the image storage 157.

The image storage 157 stores the first image PM1 from a second frame FR2 to a first frame FR1. The first frame FR1 is a frame of the first image PM1 which is input to the first projector 100A when the stoppage detector 152 has detected that the projection by the first projector 100A has stopped. The second frame FR2 is a frame of the first image PM1 a predetermined number N of frames before the first frame FR1. The predetermined number N is, for example, 10. The first image PM1 from the second frame FR2 to the first frame FR1 is stored in the image storage 157 by the stoppage detector 152.

The projection instructor 151 makes the first projector 100A project the first image light beam PLA corresponding to the first image PM1 in the first area AR1 of the screen SC. Further, the projection instructor 151 makes the second projector 100B project the second image light beam PLB corresponding to the first image PM1 in the first area AR1 of the screen SC. Further, the projection instructor 151 makes the third projector 100C project the third image light beam PLC corresponding to the second image PM2 in the second area AR2 of the screen SC.

Further, the projection instructor 151 makes the liquid crystal panel 115 of the fourth projector 100D display the second image PM2, and makes the projection unit 110 of the fourth projector 100D project the fourth image light beam PLD corresponding to the second image PM2 in the second area AR2 of the screen SC.

In other words, the projection instructor 151 makes the first projector 100A and the second projector 100B project the first image PM1 in the first area AR1 of the screen SC. Further, the projection instructor 151 makes the third projector 100C and the fourth projector 100D project the second image PM2 in the second area AR2 of the screen SC. In this way, the projection instructor 151 makes the first projector 100A through the fourth projector 100D project the first image PM1 and the second image PM2 in the first area AR1 and the second area AR2.

The stoppage detector 152 detects that the projection by the first projector 100A has stopped. When the projection by the first projector 100A has stopped, for example, the first controller 150 of the first projector 100A transmits stoppage information representing the fact that the projection by the first projector 100A has stopped to the fourth projector 100D. The stoppage detector 152 receives the stoppage information from the first projector 100A to thereby detect that the projection by the first projector 100A has stopped.

Further, when the stoppage detector 152 has detected the fact that the projection by the first projector 100A has stopped, the stoppage detector 152 stores the first image PM1 from the second frame FR2 to the first frame FR1 in the image storage 157.

For example, the stoppage detector 152 stores the predetermined number N of frames of the first image PM1 in the image storage 157. Further, every time the frame of the first image PM1 to be projected by the first projector 100A is updated, the stoppage detector 152 updates the oldest one of the predetermined number N of frames of the first image PM1 stored in the image storage 157 with the latest one. Further, when the stoppage detector 152 has detected that the projection by the first projector 100A has stopped, the stoppage detector 152 stops the updating processing described above. The fact that the projection has stopped means a state in which the projection of the projection light is not performed due to a trouble of, for example, the projection unit 110, the driver 120, or the first controller 150. The fact that the projection has stopped means when the light source unit 111 has stopped emitting light due to, for example, a failure.

When the stoppage detector 152 has detected the fact that the projection by the first projector 100A has stopped, the selector 153 selects either one of first processing PR1 and second processing PR2 based on a luminance variation ΔBR of the first image PM1 as an input image. The first processing PR1 is processing of adjusting the luminance of the light source 111A of the first projector group GA, namely the second projector 100B, in a stepwise manner in two or more times in a first period PE1. The second processing PR2 is processing of adjusting the luminance of the light source 111A of the first projector group GA, namely the second projector 100B, in a stepwise manner at a time in a second period PE2 shorter than the first period PE1.

The first period PE1 is, for example, 200 msec. The second period PE2 is, for example, 50 msec.

The luminance variation ΔBR is a difference between an average pixel value V1 of the first frame FR1 of the first image PM1 as the input image and an average pixel value V2 of the second frame FR2 prior to the first frame FR1. The first frame FR1 is a frame of the first image PM1 which is input to the second projector 100B when the stoppage detector 152 has detected that the projection by the first projector 100A has stopped. The second frame FR2 is a frame the predetermined number N of frames before the first frame FR1. The predetermined number N is, for example, 10.

When the luminance variation ΔBR is lower than a first threshold value TH1, the selector 153 selects the first processing PR1. Further, when the luminance variation ΔBR is no lower than the first threshold value TH1, the selector 153 selects the second processing PR2. The first threshold value TH1 is, for example, 20% of a maximum value of the luminance variation ΔBR. The maximum value of the luminance variation ΔBR means the luminance variation ΔBR when the second frame FR2 is a black solid image, and the first frame FR1 is a white solid image.

The decider 154 decides a first adjustment amount AD1 of adjusting the output of the light source 111A of the first projector group GA, namely the second projector 100B, so that the luminance of the first area AR1 coincides with the luminance of the second area AR2. The luminance of the first area AR1 represents the luminance of the first area AR1 in which the image light beam of the first projector group GA is projected. The luminance of the second area AR2 represents the luminance of the second area AR2 in which the image light beam of the second projector group GB, namely the third projector 100C and the fourth projector 100D, is projected.

Further, the decider 154 executes the following processing when it is unachievable to make the luminance of the first area AR1 and the luminance of the second area AR2 coincide with each other only by adjusting the output of the light source 111A of, for example, the first projector group GA. That is, the decider 154 decides a fourth adjustment amount AD4 of adjusting the output of the light source 111A of the second projector group GB so as to fulfill the following condition.

Condition: The luminance of the second area AR2 when projecting the image light beam with the fourth adjustment amount AD4 applied to the second projector group GB coincides with the luminance of the first area AR1 when projecting the image light beam with the first adjustment amount AD1 applied to the first projector group GA.

When the selector 153 has selected the first processing PR1, the first processing unit 155 performs first adjustment processing PR11 and second adjustment processing PR12 as the first processing PR1 to project the image light beam. The first adjustment processing PR11 is processing of applying a second adjustment amount AD2 smaller than the first adjustment amount AD1 to the first projector group GA. The second adjustment processing PR12 is processing of applying a third adjustment amount AD3 no larger than a difference between the first adjustment amount AD1 and the second adjustment amount AD2 to the first projector group GA after the first adjustment processing PR11.

In the present embodiment, there will be described when the third adjustment amount AD3 coincides with the difference between the first adjustment amount AD1 and the second adjustment amount AD2. In other words, there will be described when the first processing unit 155 adjusts the luminance of the light source 111A of the first projector group GA in two steps in the first period PE1 as the first processing PR1.

For example, the first processing unit 155 projects the image light beam while applying the second adjustment amount AD2 to the first projector group GA at a first time point T1 in the first period PE1. Further, the first processing unit 155 projects the image light beam while applying the third adjustment amount AD3 to the first projector group GA at a second time point T2 subsequent to the first time point T1 in the first period PE1.

The first processing PR1 in this case will further be described with reference to FIG. 4.

The first processing unit 155 executes the following processing when it is unachievable to make the luminance of the first area AR1 and the luminance of the second area AR2 coincide with each other only by adjusting the output of the light source 111A of, for example, the first projector group GA. In other words, the first processing unit 155 projects the image light beam while applying a fifth adjustment amount AD5 smaller than the fourth adjustment amount AD4 to the second projector group GB as the first adjustment processing PR11. Further, the first processing unit 155 projects the image light beam while applying a sixth adjustment amount AD6 no larger than a difference between the fourth adjustment amount AD4 and the fifth adjustment amount AD5 to the second projector group GB as the second adjustment processing PR12.

In the present embodiment, there will be described when the sixth adjustment amount AD6 coincides with the difference between the fourth adjustment amount AD4 and the fifth adjustment amount AD5. In other words, there will be described when the first processing unit 155 adjusts the luminance of the light source 111A of the second projector group GB in two steps in the first period PE1 as the first processing PR1.

For example, at the first time point T1 in the first period PE1, the first processing unit 155 projects the image light beam while applying the second adjustment amount AD2 to the first projector group GA, and projects the image light beam while applying the fifth adjustment amount AD5 to the second projector group GB. Further, at the second time point T2 subsequent to the first time point T1 in the first period PE1, the first processing unit 155 projects the image light beam while applying the third adjustment amount AD3 to the first projector group GA, and projects the image light beam while applying the sixth adjustment amount AD6 to the second projector group GB.

The first processing PR1 in this case will further be described with reference to FIG. 5.

When the selector 153 has selected the second processing PR2, the second processing unit 156 projects the image light beam while applying the first adjustment amount AD1 to the first projector group GA.

For example, the second processing unit 156 projects the image light beam while applying the first adjustment amount AD1 to the first projector group GA in the second period PE2 shorter than the first period PE1.

The second processing PR2 in this case will further be described with reference to FIG. 4.

The second processing unit 156 executes the following processing when it is unachievable to make the luminance of the first area AR1 and the luminance of the second area AR2 coincide with each other only by adjusting the output of the light source 111A of, for example, the first projector group GA. The first processing unit 155 projects the image light beam while applying the first adjustment amount AD1 to the first projector group GA, and projects the image light beam while applying the fourth adjustment amount AD4 to the second projector group GB.

The second processing PR2 in this case will further be described with reference to FIG. 5.

Then, there will be described when the first processing unit 155 and the second processing unit 156 adjust only the first projector group GA with reference to FIG. 4.

Figure 4:
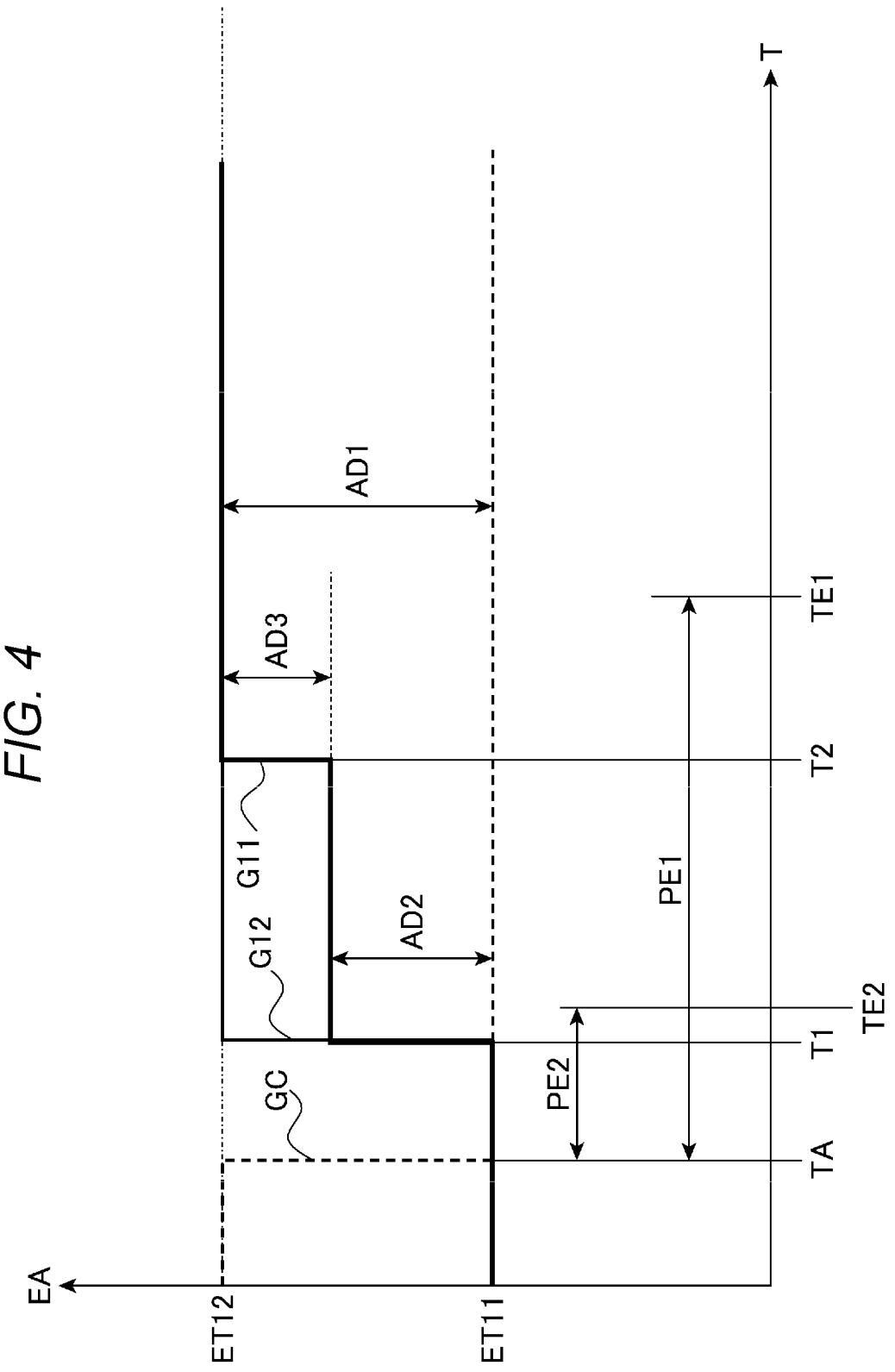
FIG. 4 is a graph showing an example of first processing and second processing.

FIG. 4 is a graph showing an example of the first processing PR1 and the second processing PR2. In FIG. 4, the horizontal axis represents time T, and the vertical axis represents luminance EA of the first area AR1.

There will be described when the output of the light source 111A of each of the first projector 100A through the fourth projector 100D is 50% before the projection by the first projector 100A stops. In this case, the luminance of the first area AR1 and the second area AR2 is, for example, 100%. It should be noted that the luminance EA of the first area AR1 is described as a sum of the output of the light source 111A of the first projector 100A and the output of the light source 111A of the second projector 100B. Further, the luminance of the second area AR2 is described as a sum of the output of the light source 111A of the third projector 100C and the output of the light source 111A of the fourth projector 100D.

As shown in FIG. 4, the projection by the first projector 100A stops at a time point TA. As a result, as shown in the graph GC, the luminance EA of the first area AR1 decreases from second luminance ET12 to first luminance ET11. The second luminance ET12 is 100%, and the first luminance ET11 is 50%.

The decider 154 decides the first adjustment amount AD1 as an increase by 50%. First, there will be described when the selector 153 has selected the first processing PR1.

As represented by the graph G11, the first processing unit 155 projects the image light beam while applying the second adjustment amount AD2 to the first projector group GA at the first time point T1 in the first period PE1. The first period PE1 is a period from the time point TA to a time point TE1. The first period PE1 is, for example, 300 msec. The first time point T1 represents a time point when, for example, 50 msec elapses from the time point TA. The second adjustment amount AD2 is, for example, an increase by 30%. Specifically, the first processing unit 155 adjusts the output of the light source 111A of the second projector 100B from 50% to 80% at the first time point T1.

Then, as represented by the graph G11, the first processing unit 155 projects the image light beam while applying the third adjustment amount AD3 to the first projector group GA at the second time point T2 in the first period PE'. The second time point T2 represents a time point when, for example, 200 msec elapses from the time point TA. The third adjustment amount AD3 is, for example, an increase by 20%. It should be noted that the third adjustment amount AD3 is the difference between the first adjustment amount AD1 and the second adjustment amount AD2. Specifically, the first processing unit 155 adjusts the output of the light source 111A of the second projector 100B from 80% to 100% at the second time point T2.

As a result, the luminance EA of the first area AR1 becomes the second luminance ET12 by being adjusted in a stepwise manner in two or more times. Specifically, the luminance EA of the first area AR1 coincides with the luminance of the second area AR2.

Then, there will be described when the selector 153 has selected the second processing PR2. As represented by the graph G12, the second processing unit 156 projects the image light beam while applying the first adjustment amount AD1 to the first projector group GA at the first time point T1 in the second period PE2. The first adjustment amount AD1 is an increase by 50%. Specifically, the second processing unit 156 adjusts the output of the light source 111A of the second projector 100B from 50% to 100% at a time at the first time point T1.

As a result, the luminance EA of the first area AR1 becomes the second luminance ET12. Specifically, the luminance EA of the first area AR1 coincides with the luminance of the second area AR2.

As described with reference to FIG. 4, in the second processing PR2, the output of the light source 111A of the first projector group GA is adjusted at a time in the second period PE2. In contrast, in the first processing PR1, the output of the light source 111A of the first projector group GA is adjusted in a stepwise manner in the first period PE1 longer than the second period PE2. Therefore, by executing the first processing PR1, it is possible to decrease the possibility that the user has a feeling of strangeness during the execution of the processing of adjusting the luminance compared to when executing the second processing PR2.

Further, although there is described when adjusting the output of the light source 111A of the first projector group GA in two steps in the first processing PR1 in FIG. 4, but this is not a limitation. It is also possible to adjust the output of the light source 111A of the first projector group GA in three or more steps in the first processing PR1.

Further, it is preferable that the smaller the luminance variation ΔBR is, the more the number of steps in which the output of the light source 111A of the first projector group GA is adjusted increases. In this case, it is possible to decrease the possibility that the user has a feeling of strangeness during the execution of the processing of adjusting the luminance.

Then, there will be described when the first processing unit 155 and the second processing unit 156 adjust the first projector group GA and the second projector group GB with reference to FIG. 5.

Figure 5:
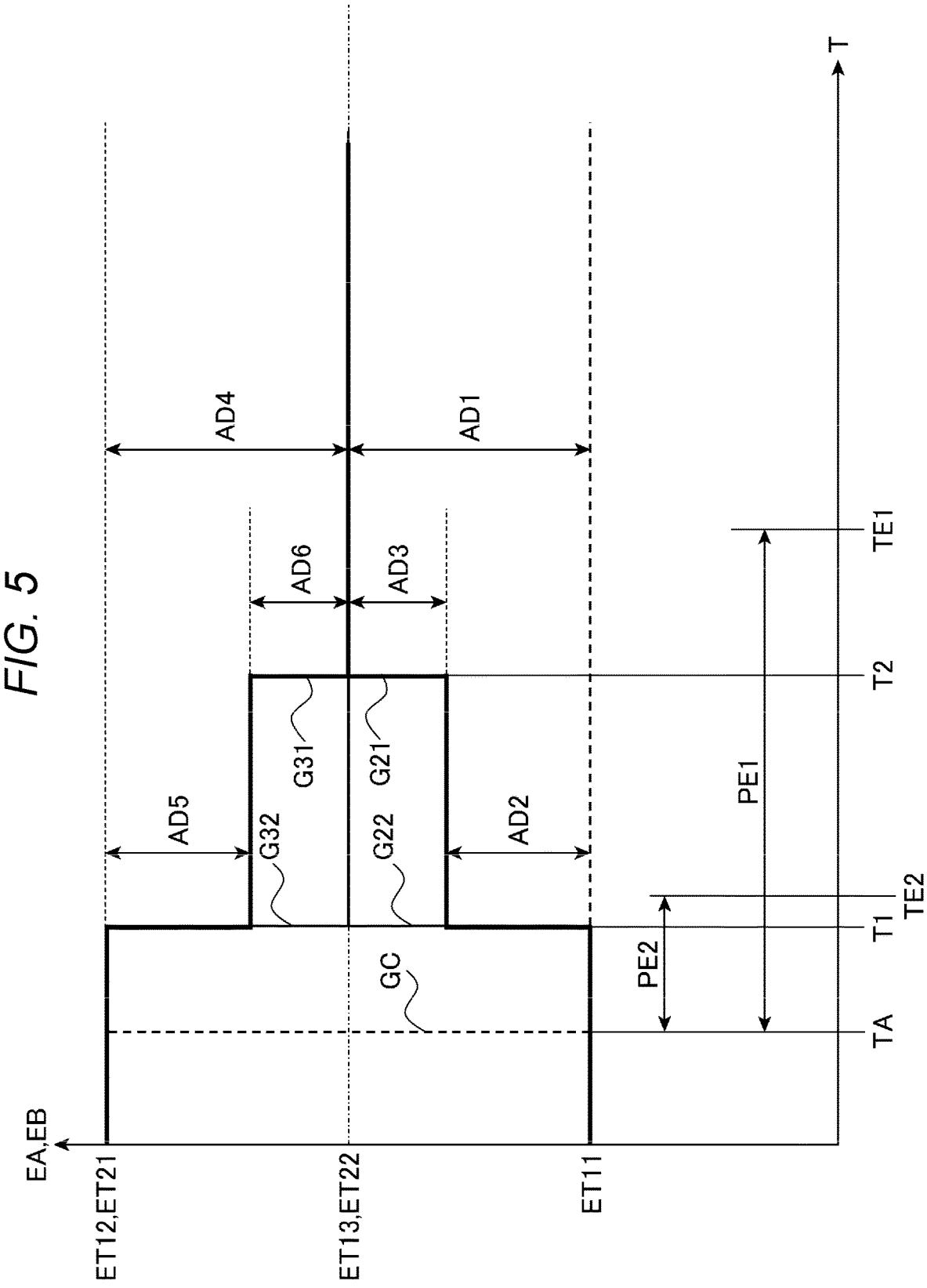
FIG. 5 is a graph showing another example of the first processing and the second processing.

FIG. 5 is a graph showing another example of the first processing PR1 and the second processing PR2. In FIG. 5, the horizontal axis represents time T, and the vertical axis represents luminance EA of the first area AR1 and the luminance EB of the second area AR2.

There will be described when the output of the light source 111A of each of the first projector 100A through the fourth projector 100D is 70% before the projection by the first projector 100A stops. In this case, the luminance of the first area AR1 and the second area AR2 is, for example, 140%. It should be noted that the luminance EA of the first area AR1 is described as the sum of the output of the light source 111A of the first projector 100A and the output of the light source 111A of the second projector 100B. Further, the luminance EB of the second area AR2 is described as the sum of the output of the light source 111A of the third projector 100C and the output of the light source 111A of the fourth projector 100D.

As shown in FIG. 5, the projection by the first projector 100A stops at the time point TA. As a result, as shown in the graph GC, the luminance EA of the first area AR1 decreases from the second luminance ET12 to the first luminance ET11. The second luminance ET12 is 140%, and the first luminance ET11 is 70%.

The decider 154 decides the first adjustment amount AD1 as an increase by 30%. First, there will be described when the selector 153 has selected the first processing PR1.

As represented by the graph G21, the first processing unit 155 projects the image light beam while applying the second adjustment amount AD2 to the first projector group GA at the first time point T1 in the first period PE1. The first period PE1 is the period from the time point TA to the time point TE1. The first period PE1 is, for example, 300 msec. The first time point T1 represents a time point when, for example, 50 msec elapses from the time point TA. The second adjustment amount AD2 is, for example, an increase by 20%. Specifically, the first processing unit 155 adjusts the output of the light source 111A of the second projector 100B from 70% to 90% at the first time point T1.

Further, as represented by the graph G31, the first processing unit 155 projects the image light beam while applying the fifth adjustment amount AD5 to the second projector group GB at the first time point T1 in the first period PE1. The fifth adjustment amount AD5 is, for example, a decrease by 10%. Specifically, the first processing unit 155 adjusts the output of the light source 111A of each of the third projector 100C and the fourth projector 100D from 70% to 60% at the first time point T1. As a result, the luminance EB of the second area AR2 decreases from first luminance ET21, namely 140%, to 120%.

Then, as represented by the graph G21, the first processing unit 155 projects the image light beam while applying the third adjustment amount AD3 to the first projector group GA at the second time point T2 in the first period PE1. The second time point T2 represents a time point when, for example, 200 msec elapses from the time point TA. The third adjustment amount AD3 is, for example, an increase by 10%. It should be noted that the third adjustment amount AD3 is the difference between the first adjustment amount AD1 and the second adjustment amount AD2. Specifically, the first processing unit 155 adjusts the output of the light source 111A of the second projector 100B from 90% to third luminance ET13, namely 100%, at the second time point T2.

Further, as represented by the graph G31, the first processing unit 155 projects the image light beam while applying the sixth adjustment amount AD6 to the second projector group GB at the first time point T1 in the first period PE1. The sixth adjustment amount AD6 is, for example, a decrease by 10%. Specifically, the first processing unit 155 adjusts the output of the light source 111A of each of the third projector 100C and the fourth projector 100D from 60% to 50% at the first time point T1. As a result, the luminance EB of the second area AR2 decreases from 120% to second luminance ET22, namely 100%.

As a result, the luminance EA of the first area AR1 coincides with the luminance EB of the second area AR2.

Then, there will be described when the selector 153 has selected the second processing PR2. As represented by the graph G22, the second processing unit 156 projects the image light beam while applying the first adjustment amount AD1 to the first projector group GA at the first time point T1 in the second period PE2. The first adjustment amount AD1 is an increase by 30%. Specifically, the second processing unit 156 adjusts the output of the light source 111A of the second projector 100B from 70% to 100% at the first time point T1.

Further, as represented by the graph G32, the second processing unit 156 projects the image light beam while applying the fourth adjustment amount AD4 to the second projector group GB at the first time point T1 in the second period PE2. The fourth adjustment amount AD4 is a decrease by 40%. Specifically, the second processing unit 156 adjusts the output of the light source 111A of the second projector group GB from 140% to 100% at the first time point T1.

As a result, the luminance EA of the first area AR1 coincides with the luminance EB of the second area AR2.

As described with reference to FIG. 5, in the second processing PR2, the output of the light source 111A of each of the first projector group GA and the second projector group GB is adjusted in a stepwise manner in the second period PE2. In contrast, in the first processing PR1, the output of the light source 111A of each of the first projector group GA and the second projector group GB is adjusted in a stepwise manner in the first period PE1 longer than the second period PE2. Therefore, by executing the first processing PR1, it is possible to decrease the possibility that the user has a feeling of strangeness during the execution of the processing of adjusting the luminance compared to when executing the second processing PR2.

Further, although there is described when adjusting the output of the light source 111A of each of the first projector group GA and the second projector group GB in two steps, namely in twice, in the first processing PR1 in FIG. 5, but this is not a limitation. It is also possible to adjust the output of the light source 111A of each of the first projector group GA and the second projector group GB in three or more steps, namely in three or more times, in the first processing PR1.

Further, it is preferable that the smaller the luminance variation ΔBR is, the more the number of steps, namely the number of times, in which the output of the light source 111A of each of the first projector group GA and the second projector group GB is adjusted increases. In this case, it is possible to decrease the possibility that the user has a feeling of strangeness during the execution of the processing of adjusting the luminance.

Then, processing of the first controller 150 of the fourth projector 100D will be described with reference to FIG. 6 through FIG. 8. It should be noted that in FIG. 6 through FIG. 8, there will be described when the decider 154 decides the first adjustment amount AD1 and the fourth adjustment amount AD4. In other words, there will be described when adjusting the output of the light source 111A of the first projector group GA and the output of the light source 111A of the second projector group GB.

Figure 6:
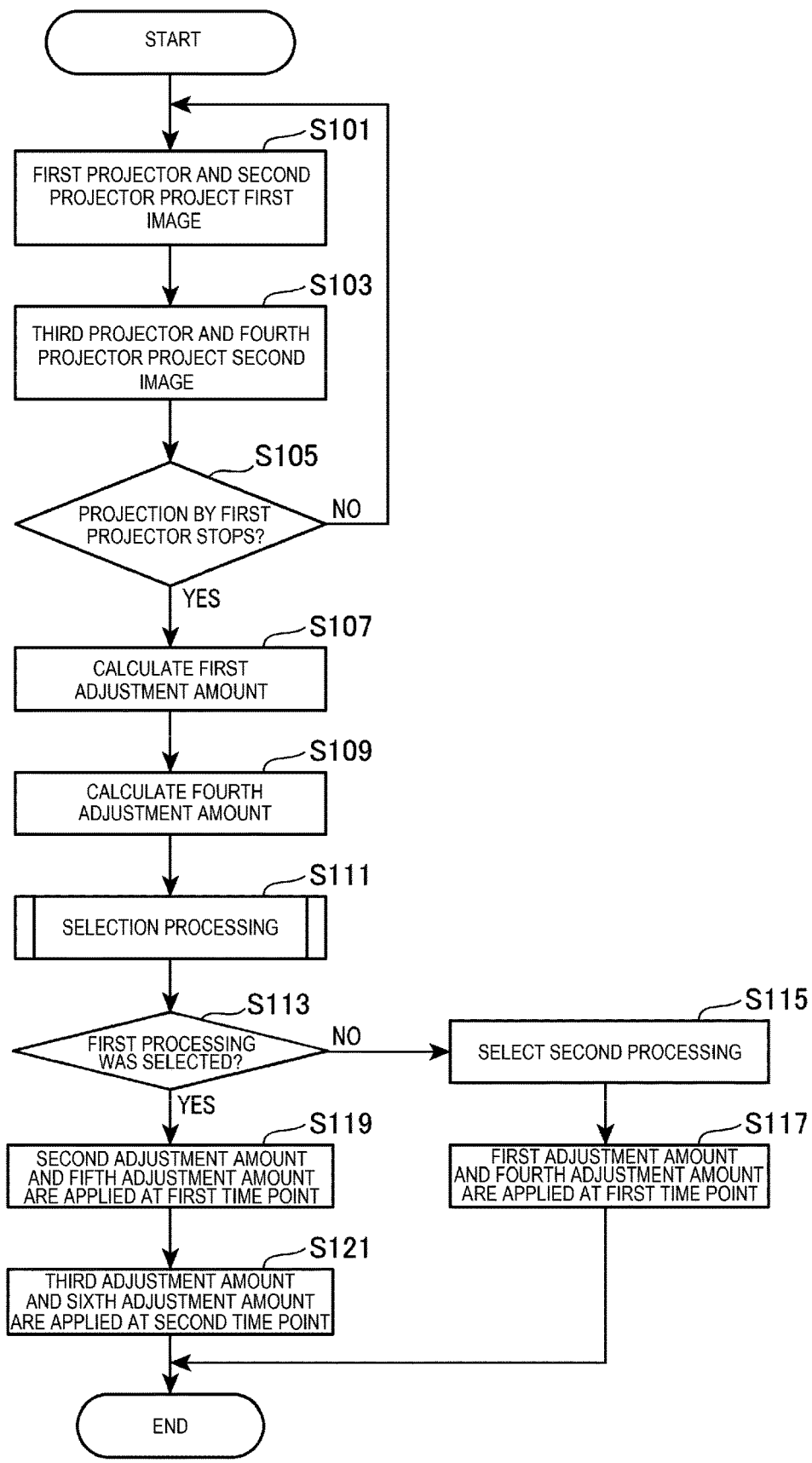
FIG. 6 is a flowchart showing an example of processing of a first controller of the fourth projector.

FIG. 6 is a flowchart showing an example of the processing of the first controller 150 of the fourth projector 100D.

As shown in FIG. 6, first, in the step S101, the projection instructor 151 makes the first projector 100A and the second projector 100B project the image light beams corresponding to the first image PM1 in the first area AR1 of the screen SC.

Then, in the step S103, the projection instructor 151 makes the third projector 100C and the fourth projector 100D project the image light beams corresponding to the second image PM2 in the second area AR2 of the screen SC.

Then, in the step S105, the stoppage detector 152 determines whether or not the projection by the first projector 100A has stopped.

When the stoppage detector 152 has determined that the projection by the first projector 100A has not stopped (NO in the step S105), the process returns to the step S101. When the stoppage detector 152 has determined that the projection by the first projector 100A has stopped (YES in the step S105), the process proceeds to the step S107.

Then, in the step S107, the decider 154 decides the first adjustment amount AD1. Then, in the step S109, the decider 154 decides the fourth adjustment amount AD4. It should be noted that in the step S107 and the step S109, the decider 154 decides the first adjustment amount AD1 and the fourth adjustment AD4 so as to fulfill the following condition.

Condition: The luminance of the second area AR2 when projecting the image light beam with the fourth control amount AD4 applied to the second projector group GB coincides with the luminance of the first area AR1 when projecting the image light beam with the first control amount AD1 applied to the first projector group GA.

Then, in the step S111, the selector 153 executes the selection processing. The "selection processing" means processing of selecting one of the first processing PR1 and the second processing PR2. The "selection processing" will be described with reference to FIG. 7 and FIG. 8.

In the step S113, the first controller 150 determines whether or not the selector 153 selects the first processing PR1.

When the first controller 150 has determined that the selector 153 does not select the first processing PR1 (NO in the step S113), the process proceeds to the step S115.

Then, in the step S115, the first controller 150 determines that the selector 153 has selected the second processing PR2.

Then, in the step S117, at the first time point T1, the second processing unit 156 projects the image light beam while applying the first adjustment amount AD1 to the first projector group GA, and projects the image light beam while applying the fourth adjustment amount AD4 to the second projector group GB. Subsequently, the process is terminated.

When the first controller 150 has determined that the selector 153 has selected the first processing PR1 (YES in the step S113), the process proceeds to the step S119.

Then, in the step S119, at the first time point T1, the first processing unit 155 projects the image light beam while applying the second adjustment amount AD2 to the first projector group GA, and projects the image light beam while applying the fifth adjustment amount AD5 to the second projector group GB.

Then, in the step S121, at the second time point T2, the first processing unit 155 projects the image light beam while applying the third adjustment amount AD3 to the first projector group GA, and projects the image light beam while applying the sixth adjustment amount AD6 to the second projector group GB. Subsequently, the process is terminated.

Then, the selection processing when the selector 153 selects one of the first processing PR1 and the second processing PR2 based on the luminance variation ΔBR will be described with reference to FIG. 7. It should be noted that in the following description, there will be explained when the image storage 157 stores the first image PM1 from the second frame FR2 to the first frame FR1.

The first frame FR1 is the frame of the first image PM1 which is input to the first projector 100A when the projection by the first projector 100A has stopped. The second frame FR2 is the frame of the first image PM1 the predetermined number N of frames before the first frame FR1. The predetermined number N is, for example, 10.

Figure 7:
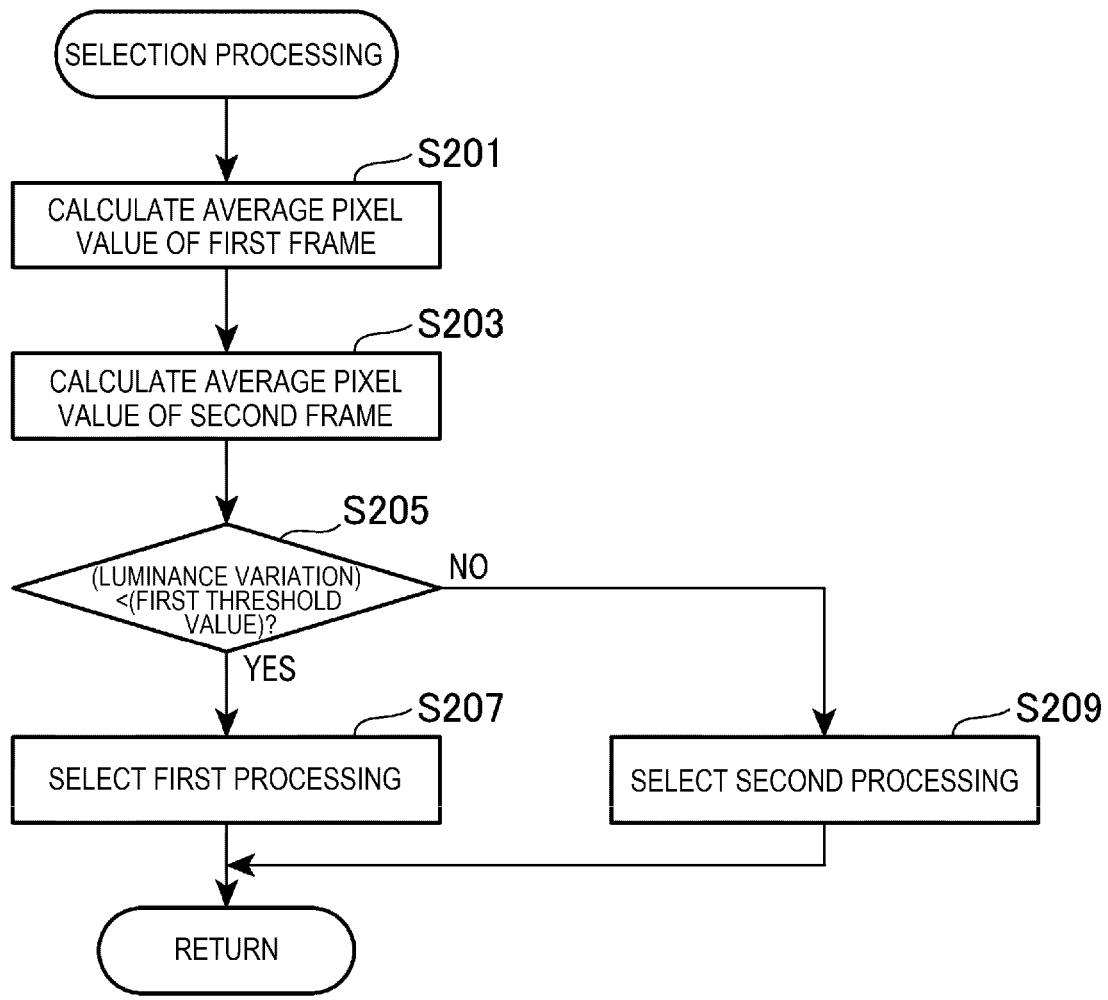
FIG. 7 is a flowchart showing an example of selection processing.

FIG. 7 is a flowchart showing an example of the selection processing to be executed in the step S111 shown in FIG. 6.

As shown in FIG. 7, first, in the step S201, the selector 153 calculates the average pixel value V1 of the first frame FR1 of the first image PM1 as the input image.

Then, in the step S203, the selector 153 calculates the average pixel value V2 of the second frame FR2 of the first image PM1 as the input image.

Then, in the step S205, the selector 153 determines whether or not the luminance variation ΔBR is lower than the first threshold value TH1. The luminance variation ΔBR is the difference between the average pixel value V1 and the average pixel value V2. The first threshold value TH1 is, for example, 20% of the maximum value of the luminance variation ΔBR. When the selector 153 has determined that the luminance variation ΔBR is lower than the first threshold value TH1 (YES in the step S205), the process proceeds to the step S207.

Then, in the step S207, the selector 153 selects the first processing PR1. Subsequently, the process returns to the step S113 shown in FIG. 6.

When the selector 153 has determined that the luminance variation ΔBR is no lower than the first threshold value TH1 (NO in the step S205), the process proceeds to the step S209.

Then, in the step S209, the selector 153 selects the second processing PR2. Subsequently, the process returns to the step S113 shown in FIG. 6.

As described with reference to FIG. 7, the selector 153 selects one of the first processing PR1 and the second processing PR2 based on the luminance variation ΔBR. Therefore, it is possible to appropriately select one of the first processing PR1 and the second processing PR2.

In the present embodiment, there is described when the luminance variation ΔBR is the difference between the average pixel value V1 of the first frame FR1 of the input image and the average pixel value V2 of the second frame FR2 prior to the first frame FR1, but this is not a limitation. For example, it is possible to calculate absolute values of the differences between the average pixel values between the frames adjacent to each other in a period from the second frame FR2 to the first frame FR1, and calculate the average value thereof as the luminance variation ΔBR. In this case, it is possible to appropriately select one of the first processing PR1 and the second processing PR2.

Then, the selection processing when the selector 153 selects one of the first processing PR1 and the second processing PR2 based on peripheral luminance BRS of the screen SC will be described with reference to FIG. 8. FIG. 8 is a flowchart showing another example of the selection processing to be executed in the step S111 shown in FIG. 6.

Figure 8:
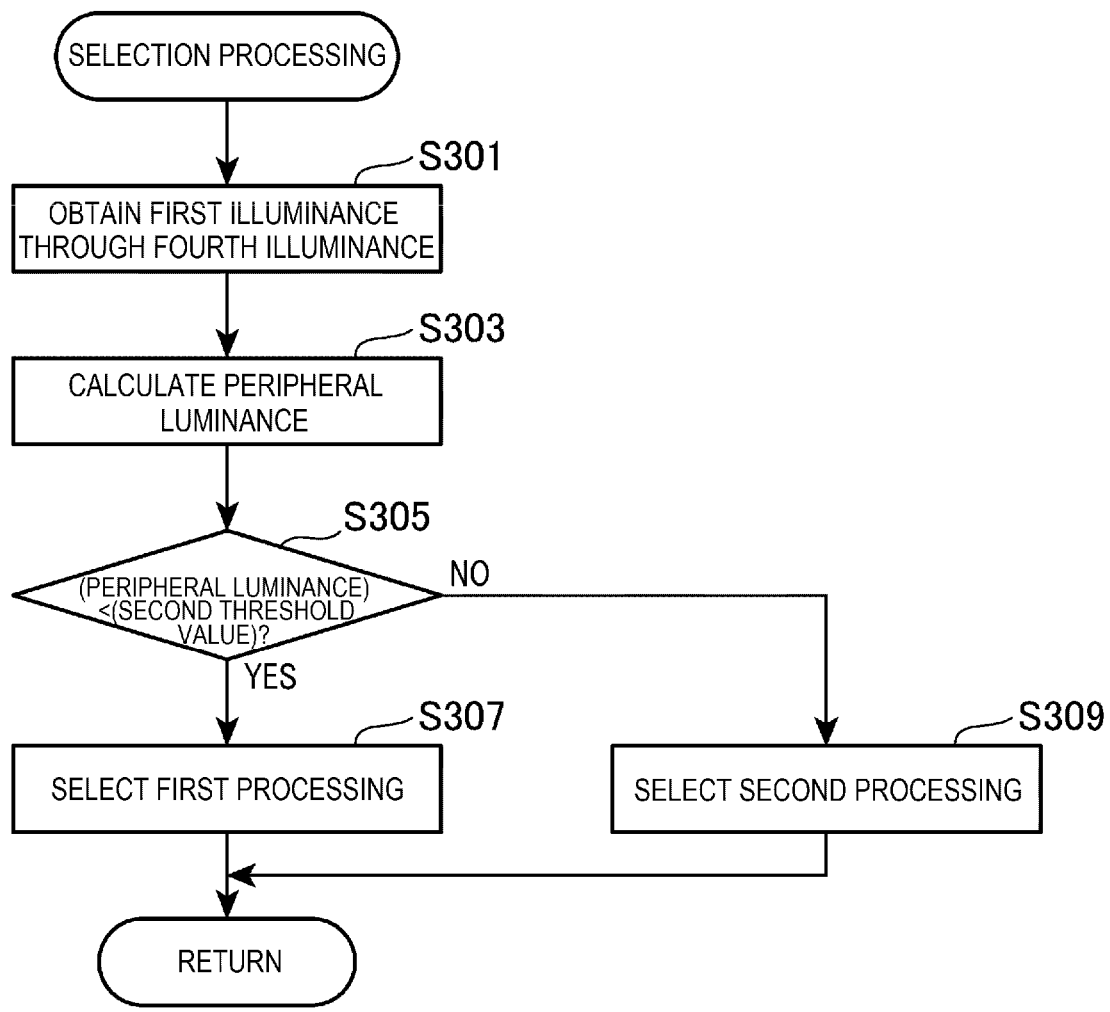
FIG. 8 is a flowchart showing another example of the selection processing.

As shown in FIG. 8, first, in the step S301, the selector 153 obtains the first illuminance BRA, second illuminance BRB, third illuminance BRC, and fourth illuminance BRD when the projection by the first projection has stopped.

The first illuminance BRA is illuminance detected by the illuminance sensor 170 of the first projector 100A. The second illuminance BRB is illuminance detected by the illuminance sensor 170 of the second projector 100B. The third illuminance BRC is illuminance detected by the illuminance sensor 170 of the third projector 100C. The fourth illuminance BRD is illuminance detected by the illuminance sensor 170 of the fourth projector 100D.

Then, in the step S303, the selector 153 calculates the average value of the first illuminance BRA through the fourth illuminance BRD as the peripheral luminance BRS of the screen SC.

Then, in the step S305, the selector 153 determines whether or not the peripheral luminance of the screen SC is lower than a second threshold value TH2. The second threshold value TH2 is, for example, 30 1×.

When it has been determined that the peripheral luminance BRS of the screen SC is lower than the second threshold value TH2 (YES in the step S305), the process proceeds to the step S307.

Then, in the step S307, the selector 153 selects the first processing PR1. Subsequently, the process returns to the step S113 shown in FIG. 6.

When it has been determined that the peripheral luminance BRS of the screen SC is no lower than the second threshold value TH2 (NO in the step S305), the process proceeds to the step S309.

Then, in the step S309, the selector 153 selects the second processing PR2. Subsequently, the process returns to the step S113 shown in FIG. 6.

As described with reference to FIG. 8, the selector 153 selects one of the first processing PR1 and the second processing PR2 based on the peripheral luminance BRS of the screen SC. Therefore, it is possible to appropriately select one of the first processing PR1 and the second processing PR2.

In the present embodiment, there is described when the selector 153 calculates the average value of the first illuminance BRA through the fourth illuminance BRD as the peripheral luminance BRS of the screen SC, but this is not a limitation. It is sufficient for the selector 153 to calculate the peripheral luminance BRS of the screen SC based on at least one of the first illuminance BRA through the fourth illuminance BRD. For example, it is possible for the selector 153 to calculate the lowest one of the first illuminance BRA through the fourth illuminance BRD as the peripheral luminance BRS of the screen SC.

Functions and Advantages of Present Embodiment

As described hereinabove with reference to FIG. 1 through FIG. 8, the method of controlling the projector 100 according to the present embodiment includes performing the tiling projection in the first area AR1 and the second area AR2 of the screen SC by projecting the image light beams in the first area AR1 by the first projector 100A and the first projector group GA including one or more projectors, and projecting the image light beams in the second area AR2 by the second projector group GB including two or more projectors, selecting one of the first processing PR1 of adjusting the luminance of the light source 111A of the first projector group GA in a plurality of times in the first period PE1 and the second processing PR2 of adjusting the luminance of the light source 111A of the first projector group GA at a time in the second period PE2 shorter than the first period PR1 based on at least one of the luminance variation ΔBR of the input image and the peripheral luminance BRS of the screen SC when the projection by the first projector 100A has stopped, deciding the first adjustment amount AD1 of adjusting the output of the light source 111A of the first projector group GA so that the luminance of the first area AR1 in which the image light beam of the first projector group GA is projected coincides with the luminance of the second area AR2 in which the image light beam of the second projector group GB is projected, performing the first adjustment processing PR11 of applying the second adjustment amount AD2 smaller than the first adjustment amount AD1 to the first projector group GA when the first processing PR1 is selected, projecting, by the first projector group GA, the image light beam after performing the first adjustment processing PR11, performing the second adjustment processing PR12 of applying the third adjustment amount AD3 no larger than the difference between the first adjustment amount AD1 and the second adjustment amount AD2 to the first projector group GA after the projecting the image light beam by the first projector group GA, and projecting, by the first projector group GA, the image light beam after performing the second adjustment processing PR12.

Specifically, the method of controlling the projector 100 according to the present embodiment includes performing the first adjustment processing PR11 of applying the second adjustment amount AD2 smaller than the first adjustment amount AD1 to the first projector group GA when the projection by the first projector 100A has stopped and the first processing PR1 has been selected, projecting, by the first projector group GA, the image light beam after performing the first adjustment processing PR11, performing the second adjustment processing PR12 of applying the third adjustment amount AD3 no larger than the difference between the first adjustment amount AD1 and the second adjustment amount AD2 to the first projector group GA after the projecting the image light beam by the first projector group GA, and projecting, by the first projector group GA, the image light beam after performing the second adjustment processing PR12.

In other words, compared to when executing the second processing PR2 of performing the adjustment at a time in the second period PE2 shorter than the first period PE1, in the first processing PR1, the luminance of the first projector group GA is adjusted in two or more times in the first period PE1. Therefore, compared to when executing the second processing PR2, in the first processing PR1, it is possible to prevent the user from having a feeling of strangeness during the execution of the adjustment processing of the luminance of the first projector group GA. Therefore, when the projection by the first projector 100A stops, it is possible to prevent the user from having a feeling of strangeness during the execution of the processing of adjusting the luminance of the first projector group GA.

Further, the method of controlling the projector 100 includes deciding the fourth adjustment amount AD4 of adjusting the output of the light source 111A of the second projector group GB when the first processing PR1 is selected, and the first processing PR1 includes applying the fifth adjustment amount AD5 smaller than the fourth adjustment amount AD4 to the second projector group GB, projecting the image light beam by the second projector group GB after applying the fifth adjustment amount AD5 to the second projector group GB, applying the sixth adjustment amount AD6 no larger than the difference between the fourth adjustment amount AD4 and the fifth adjustment amount AD5 to the second projector group GB, and projecting the image light beam by the second projector group GB after applying the sixth adjustment amount AD6 to the second projector group GB.

In other words, compared to when executing the second processing PR2 of performing the adjustment at a time in the second period PE2 shorter than the first period PE1, in the first processing PR1, the luminance of the second projector group GB is adjusted in two or more times in the first period PE'. Therefore, compared to when executing the second processing PR2, in the first processing PR1, it is possible to prevent the user from having a feeling of strangeness during the execution of the processing of adjusting the luminance of the second projector group GB. Therefore, when the projection by the first projector 100A stops, it is possible to prevent the user from having a feeling of strangeness during the execution of the processing of adjusting the luminance of the second projector group GB.

Further, in the method of controlling the projector 100, the first processing PR1 includes applying the second adjustment amount AD2 to the first projector group GA at the first time point T1 in the first period PE1, projecting the image light beam by the first projector group GA after applying the second adjustment amount AD2 to the first projector group GA, applying the fifth adjustment amount AD5 to the second projector group GB, projecting the image light beam by the second projector group GB after applying the fifth adjustment amount AD5 to the second projector group GB, applying the third adjustment amount AD3 to the first projector group GA at the second time point T2 subsequent to the first time point T1 in the first period PE1, projecting the image light beam by the first projector group GA after applying the third adjustment amount AD3 to the first projector group GA, applying the sixth adjustment amount AD6 to the second projector group GB at the second time point T2, and projecting the image light beam by the second projector group GB after applying the sixth adjustment amount AD6 to the second projector group GB.

Therefore, it is possible to adjust the luminance of each of the first projector group GA and the second projector group GB at the same time at the first time point T1 and the second time point T2 in the first period PE'. Therefore, it is possible to prevent the user from having a feeling of strangeness during the execution of the processing of adjusting the luminance of each of the first projector group GA and the second projector group GB.

Further, the method of controlling the projector 100 includes applying the first adjustment amount AD1 to the first projector group GA when the second processing PR2 has been selected, and projecting the image light beam by the first projector group GA after applying the first adjustment amount AD1 to the first projector group GA.

Therefore, when executing the second processing PR2, it is possible to adjust the luminance of the first projector group GA in a shorter time and with simpler processing compared to when executing the first processing PR1.

Further, the method of controlling the projector 100 includes deciding the fourth adjustment amount AD4 of adjusting the output of the light source 111A of the second projector group GB when the second processing PR2 is selected, and the second processing PR2 includes applying the first adjustment amount AD1 to the first projector group GA in the second period PE2, projecting the image light beam by the first projector group GA after applying the first adjustment amount AD1 to the first projector group GA, applying the fourth adjustment amount AD4 to the second projector group GB in the second period PE2, and projecting the image light beam by the second projector group GB after applying the fourth adjustment amount AD4 to the second projector group GB.

Therefore, when executing the second processing PR2, it is possible to adjust the luminance of each of the first projector group GA and the second projector group GB in a shorter time and with simpler processing compared to when executing the first processing PR1.

Further, in the method of controlling the projector 100, deciding the fourth adjustment amount AD4 includes deciding the fourth adjustment amount AD4 so that the luminance of the second area AR2 when the second projector group GB projects the image light beam after applying the fourth adjustment amount AD4 to the second projector group GB coincides with the luminance of the first area AR1 when the first projector group GA projects the image light beam after applying the first adjustment amount AD1 to the first projector group GA.

Therefore, it is possible to make the luminance of the second area AR2 coincide with the luminance of the first area AR1. Therefore, it is possible to decide the fourth adjustment amount AD4 to an appropriate value.

Further, in the method of controlling the projector 100, selecting either one of the first processing PR1 and the second processing PR2 includes selecting the first processing PR1 when the luminance variation ΔBR as the difference between the average pixel value V1 of the first frame FR1 of the input image input to the first projector group GA and the average pixel value V2 of the second frame FR2 subsequent to the first frame FR1 when the projection by the first projector 100A stops is lower than the first threshold value TH1, and selecting the second processing PR2 when the luminance variation ΔBR when the projection by the first projector 100A stops is no lower than the first threshold value TH1.

Therefore, since the first processing PR1 is selected when the luminance variation ΔBR is lower than the first threshold value TH1, and the second processing PR2 is selected when the luminance variation ΔBR is no lower than the first threshold value TH1, by appropriately setting the first threshold value TH1, it is possible to appropriately select either one of the first processing PR1 and the second processing PR2.

Further, in the method of controlling the projector 100, selecting either one of the first processing PR1 and the second processing PR2 includes selecting the first processing PR1 when the peripheral luminance BRS of the screen SC when the projection by the first projector 100A stops is lower than the second threshold value TH2, and selecting the second processing PR2 when the peripheral luminance BRS of the screen SC is no lower than the second threshold value TH2.

In other words, when the peripheral luminance BRS of the screen SC when the projection by the first projector 100A stops is lower than the second threshold value TH2, the first processing PR1 is selected, and when the peripheral luminance BRS of the screen SC is no lower than the second threshold value TH2, the second processing PR2 is selected. Therefore, by appropriately setting the second threshold value TH2, it is possible to appropriately select either one of the first processing PR1 and the second processing PR2.

The first program PGM1 according to the present embodiment makes the first processor 150A of the fourth projector 100D execute performing the tiling projection in the first area AR1 and the second area AR2 of the screen SC by projecting the image light beams in the first area AR1 by the first projector 100A and the first projector group GA including one or more projectors, and projecting the image light beams in the second area AR2 by the second projector group GB including two or more projectors, selecting one of the first processing PR1 of adjusting the luminance of the light source 111A of the first projector group GA in a plurality of times in the first period PE1 and the second processing PR2 of adjusting the luminance of the light source 111A of the first projector group GA at a time in the second period PE2 shorter than the first period PR1 based on at least one of the luminance variation ΔBR of the input image and the peripheral luminance BRS of the screen SC when the projection by the first projector 100A has stopped, deciding the first adjustment amount AD1 of adjusting the output of the light source 111A of the first projector group GA so that the luminance of the first area AR1 in which the image light beam of the first projector group GA is projected coincides with the luminance of the second area AR2 in which the image light beam of the second projector group GB is projected, performing the first adjustment processing PR11 of applying the second adjustment amount AD2 smaller than the first adjustment amount AD1 to the first projector group GA when the first processing PR1 is selected, projecting, by the first projector group GA, the image light beam after performing the first adjustment processing PR11, performing the second adjustment processing PR12 of applying the third adjustment amount AD3 no larger than the difference between the first adjustment amount AD1 and the second adjustment amount AD2 to the first projector group GA after the projecting the image light beam by the first projector group GA, and projecting, by the first projector group GA, the image light beam after performing the second adjustment processing PR12.

Therefore, it is possible for the first control program PGM1 according to the present embodiment to exert substantially the same advantages as those of the method of controlling the projector 100 according to the present embodiment.

The fourth projector 100D according to the present embodiment includes the light source 111A, the first memory 150B, and the first processor 150A, wherein the first processor 150A executes performing the tiling projection in the first area AR1 and the second area AR2 of the screen SC by projecting the image light beams in the first area AR1 by the first projector 100A and the first projector group GA including the second projector 100B, and projecting the image light beams in the second area AR2 by the second projector group GB including the third projector 100C and the fourth projector 100D, selecting one of the first processing PR1 of adjusting the luminance of the light source 111A of the first projector group GA in a plurality of times in the first period PE1 and the second processing PR2 of adjusting the luminance of the light source 111A of the first projector group GA at a time in the second period PE2 shorter than the first period PR1 based on at least one of the luminance variation ΔBR of the input image and the peripheral luminance BRS of the screen SC when the projection by the first projector 100A has stopped, deciding the first adjustment amount AD1 of adjusting the output of the light source 111A of the first projector group GA so that the luminance of the first area AR1 in which the image light beam of the first projector group GA is projected coincides with the luminance of the second area AR2 in which the image light beam of the second projector group GB is projected, performing the first adjustment processing PR11 of applying the second adjustment amount AD2 smaller than the first adjustment amount AD1 to the first projector group GA when the first processing PR1 is selected, projecting, by the first projector group GA, the image light beam after performing the first adjustment processing PR11, performing the second adjustment processing PR12 of applying the third adjustment amount AD3 no larger than the difference between the first adjustment amount AD1 and the second adjustment amount AD2 to the first projector group GA after the projecting the image light beam by the first projector group GA, and projecting, by the first projector group GA, the image light beam after performing the second adjustment processing PR12, and the fourth projector 100D is included in the second projector group GB.

Therefore, it is possible for the fourth projector 100D according to the present embodiment to exert substantially the same advantages as those of the method of controlling the projector 100 according to the present embodiment.

OTHER EMBODIMENTS

The present embodiment described above is a preferred aspect of implementation. It should be noted that the embodiment described above is not a limitation, but a variety of types of modified implementation are possible within the scope or the spirit thereof.

In the present embodiment, there is described when the first projector group GA is formed of a single projector, namely the second projector 100B for the sake of convenience with reference to FIG. 1 through FIG. 8, but this is not a limitation. It is possible for the first projector group GA to include two or more projectors.

Further, in the present embodiment, there is described when the second projector group GB is constituted by the two projectors, namely the third projector 100C and the fourth projector 100D, but this is not a limitation. It is possible for the second projector group GB to include three or more projectors.

In the present embodiment, there is described when the fourth projector 100D functions as the primary projector, but this is not a limitation. Any one of the first projector 100A through the third projector 100C can function as the primary projector.

Further, in the present embodiment, there is described when the first controller 150 of the fourth projector 100D is provided with the projection instructor 151, the stoppage detector 152, the selector 153, the decider 154, the first processing unit 155, the second processing unit 156, and the image storage 157, but this is not a limitation.

For example, it is possible for the first controller 150 of any one of the first projector 100A through the third projector 100C to be provided with the projection instructor 151, the stoppage detector 152, the selector 153, the decider 154, the first processing unit 155, the second processing unit 156, and the image storage 157. Further, for example, it is possible for a second controller of the image supply device 200 to be provided with the projection instructor 151, the stoppage detector 152, the selector 153, the decider 154, the first processing unit 155, the second processing unit 156, and the image storage 157.

Further, the functional units shown in FIG. 3 are for showing the functional configuration, and the specific implementation configuration is not particularly limited. In other words, it is not necessarily required to install the hardware individually corresponding to each of the constituents, but it is possible to adopt a configuration of realizing the functions of the plurality of constituents by a single processor executing a program. Further, a part of the function realized by software in the embodiment described above can also be realized by hardware, or apart of the function realized by hardware can also be realized by software. Besides the above, the specific detailed configuration of the constituents of the projector 100 can arbitrarily be modified within the scope or the spirit thereof.

Further, the processing units of the flowcharts shown in FIG. 6 through FIG. 8 are obtained by dividing the processing of the first controller 150 of the fourth projector 100D in accordance with major processing contents in order to make the processing of the first controller 150 of the fourth projector 100D easy to understand. The way of division or the names of the processing units shown in each of the flowcharts in FIG. 6 through FIG. 8 are not a limitation, and it is also possible to divide the processing into a larger number of processing units, or it is also possible to divide the processing so that one processing unit includes a larger amount of processing in accordance with the processing contents. Further, the processing sequence of the flowcharts described above is not limited to the illustrated example.

Further, the method of controlling the projector 100 can be realized by making the first processor 150A provided to the projector 100 execute the first control program PGM1 corresponding to the method of controlling the projector 100. Further, it is also possible to record the first control program PGM1 on a recording medium storing the first control program PGM1 in a computer-readable manner.

As the recording medium, there can be used a magnetic or optical recording medium, or a semiconductor memory device. Specifically, there can be cited a portable or rigid recording medium such as a flexible disk, an HDD, a CD-ROM (Compact Disc Read Only Memory), a DVD, a Blu-ray (registered trademark) disc, a magnetooptic disc, a flash memory, or a card-type recording medium. Further, the recording medium can also be a RAM, or a nonvolatile storage device such as a ROM or the HDD as an internal storage device provided to the projector 100.

It is possible to realize the method of controlling the projector 100 by storing the first control program PGM1 in a server device or the like, and then downloading the first control program PGM1 from the server device to the projector 100.

Supplementary Notes

Hereinafter, the conclusion of the present disclosure will supplementarily be noted.

Supplementary Note 1

A method of controlling a projector including performing tiling projection in a first area and a second area of a projection surface by projecting image light beams in the first area by a first projector and a first projector group including one or more projectors, and projecting image light beams in the second area by a second projector group including two or more projectors, selecting either one of first processing of adjusting luminance of a light source of the first projector group in two or more times in a first period based on at least one of a luminance variation of an input image and peripheral luminance of the projection surface and second processing of adjusting the luminance of the light source of the first projector group at a time in a second period shorter than the first period when projection by the first projector stops, deciding a first adjustment amount of adjusting output of the light source of the first projector group so that luminance of the first area in which the image light beams of the first projector group are projected coincides with luminance of the second area in which the image light beams of the second projector group are projected when the projection by the first projector stops, performing first adjustment processing of applying a second adjustment amount smaller than the first adjustment amount to the first projector group when the first processing is selected, projecting, by the first projector group, the image light beams after performing the first adjustment processing, performing second adjustment processing of applying a third adjustment amount which is no larger than a difference between the first adjustment amount and the second adjustment amount to the first projector group after the projecting the image light beams by the first projector group, and projecting, by the first projector group, the image light beams after performing the second adjustment processing.

In this way, compared to when executing the second processing of performing the adjustment at a time in the second period shorter than the first period, in the first processing, the luminance of the first projector group GA is adjusted in two or more times in the first period. Therefore, in the first processing, it is possible to prevent the user from having a feeling of strangeness during the execution of the processing of adjusting the luminance compared to when executing the second processing. Therefore, when the projection by the first projector stops, it is possible to prevent the user from having a feeling of strangeness during the execution of the processing of adjusting the luminance of the first projector group.

Supplementary Note 2

The method of controlling the projector described in Supplementary Note 1 further including deciding a fourth adjustment amount of adjusting output of a light source of the second projector group when the first processing is selected, wherein the first processing includes applying a fifth adjustment amount smaller than the fourth adjustment amount to the second projector group, projecting, by the second projector group, the image light beams after applying the fifth adjustment amount to the second projector group, applying a sixth adjustment amount which is no larger than a difference between the fourth adjustment amount and the fifth adjustment amount to the second projector group, and projecting, by the second projector group, the image light beams after applying the sixth adjustment amount to the second projector group.

In this way, compared to when executing the second processing of performing the adjustment at a time in the second period shorter than the first period, in the first processing, the luminance of the second projector group is adjusted in two or more times in the first period. Therefore, in the first processing, it is possible to prevent the user from having a feeling of strangeness during the execution of the processing of adjusting the luminance compared to when executing the second processing. Therefore, when the projection by the first projector stops, it is possible to prevent the user from having a feeling of strangeness during the execution of the processing of adjusting the luminance of the second projector group.

Supplementary Note 3

The method of controlling the projector described in Supplementary Note 2 wherein the first processing includes applying the second adjustment amount to the first projector group at a first time point in the first period, projecting, by the first projector group, the image light beams after applying the second adjustment amount to the first projector group, applying the fifth adjustment amount to the second projector group at the first time point, projecting, by the second projector group, the image light beams after applying the fifth adjustment amount to the second projector group, applying the third adjustment amount to the first projector group at a second time point subsequent to the first time point in the first period, projecting, by the first projector group, the image light beams after applying the third adjustment amount to the first projector group, applying the sixth adjustment amount to the second projector group at the second time point, and projecting, by the second projector group, the image light beams after applying the sixth adjustment amount to the second projector group.

In this way, it is possible to adjust the luminance of each of the first projector group and the second projector group at the same time at the first time point and the second time point in the first period. Therefore, it is possible to prevent the user from having a feeling of strangeness during the execution of the processing of adjusting the luminance of each of the first projector group and the second projector group.

Supplementary Note 4

The method of controlling the projector described in any one of Supplementary Note 1 through Supplementary Note 3 further including applying the first adjustment amount to the first projector group when the second processing is selected, and projecting, by the first projector group, the image light beams after applying the first adjustment amount to the first projector group.

In this way, when executing the second processing, it is possible to adjust the luminance of the first projector group in a shorter time and with a simpler processing compared to when executing the first processing.

Supplementary Note 5

The method of controlling the projector described in any one of Supplementary Note 1 through Supplementary Note 3 further including deciding a fourth adjustment amount of adjusting output of a light source of the second projector group when the second processing is selected, wherein the second processing includes applying the first adjustment amount to the first projector group in the second period, projecting, by the first projector group, the image light beams after applying the first adjustment amount to the first projector group, applying the fourth adjustment amount to the second projector group in the second period, and projecting, by the second projector group, the image light beams after applying the fourth adjustment amount to the second projector group.

In this way, when executing the second processing, it is possible to adjust the luminance of each of the first projector group and the second projector group in a shorter time and with a simpler processing compared to when executing the first processing.

Supplementary Note 6

The method of controlling the projector described in Supplementary Note 5 wherein the deciding the fourth adjustment amount includes deciding the fourth adjustment amount so that the luminance of the second area when the second projector group projects the image light beams after applying the fourth adjustment amount to the second projector group coincides with the luminance of the first area when the first projector group projects the image light beams after applying the first adjustment amount to the first projector group.

In this way, it is possible to decide the fourth adjustment amount to an appropriate value. In other words, it is possible to make the luminance of the second area coincide with the luminance of the first area.

Supplementary Note 7

The method of controlling the projector described in any one of Supplementary Note 1 through Supplementary Note 6 wherein the selecting either one of the first processing and the second processing includes selecting the first processing when a difference between an average pixel value of a first frame of an input image input to the first projector group and an average pixel value of a second frame prior to the first frame when the projection by the first projector stops is lower than a first threshold value, and selecting the second processing when the difference between the average pixel value of the first frame and the average pixel value of the second frame when the projection by the first projector stops is no lower than the first threshold value.

In this way, it is possible to appropriately select either one of the first processing and the second processing.

Supplementary Note 8

The method of controlling the projector described in any one of Supplementary Note 1 through Supplementary Note 6 wherein the selecting either one of the first processing and the second processing includes selecting the first processing when peripheral luminance of the projection surface when the projection by the first projector stops is lower than a second threshold value, and selecting the second processing when the peripheral luminance of the projection surface when the projection by the first projector stops is no lower than the second threshold value.

In this way, it is possible to appropriately select either one of the first processing and the second processing.

Supplementary Note 9

Anon-transitory computer-readable storage medium storing a program configured to make a processor of a projector execute performing tiling projection in a first area and a second area of a projection surface by projecting image light beams in the first area by a first projector and a first projector group including one or more projectors, and projecting image light beams in the second area by a second projector group including two or more projectors, selecting either one of first processing of adjusting luminance of a light source of the first projector group in two or more times in a first period based on at least one of a luminance variation of an input image and peripheral luminance of the projection surface and second processing of adjusting the luminance of the light source of the first projector group at a time in a second period shorter than the first period when projection by the first projector stops, deciding a first adjustment amount of adjusting output of the light source of the first projector group so that luminance of the first area in which the image light beams of the first projector group are projected coincides with luminance of the second area in which the image light beams of the second projector group are projected when the projection by the first projector stops, performing first adjustment processing of applying a second adjustment amount smaller than the first adjustment amount to the first projector group when the first processing is selected, projecting, by the first projector group, the image light beams after performing the first adjustment processing, performing second adjustment processing of applying a third adjustment amount which is no larger than a difference between the first adjustment amount and the second adjustment amount to the first projector group after the projecting the image light beams by the first projector group, and projecting, by the first projector group, the image light beams after performing the second adjustment processing.

In this way, the program described in Supplementary Note 9 exerts substantially the same advantages as those of the method of controlling the projector described in Supplementary Note 1.

Supplementary Note 10

A projector including a light source, a memory, and at least one processor, wherein the at least one processor is configured to execute performing tiling projection in a first area and a second area of a projection surface by projecting image light beams in the first area by a first projector and a first projector group including one or more projectors, and projecting image light beams in the second area by a second projector group including two or more projectors, selecting either one of first processing of adjusting luminance of a light source of the first projector group in two or more times in a first period based on at least one of a luminance variation of an input image and peripheral luminance of the projection surface and second processing of adjusting the luminance of the light source of the first projector group at a time in a second period shorter than the first period when projection by the first projector stops, deciding a first adjustment amount of adjusting output of the light source of the first projector group so that luminance of the first area in which the image light beams of the first projector group are projected coincides with luminance of the second area in which the image light beams of the second projector group are projected when the projection by the first projector stops, performing first adjustment processing of applying a second adjustment amount smaller than the first adjustment amount to the first projector group when the first processing is selected, projecting, by the first projector group, the image light beams after performing the first adjustment processing, performing second adjustment processing of applying a third adjustment amount which is no larger than a difference between the first adjustment amount and the second adjustment amount to the first projector group after the projecting the image light beams by the first projector group, and projecting, by the first projector group, the image light beams after performing the second adjustment processing, and the projector is included in either one of the first projector group and the second projector group.

In this way, the projector described in Supplementary Note 10 exerts substantially the same advantages as those of the method of controlling the projector described in Supplementary Note 1.

What is claimed is:

1. A method of controlling a projector comprising:
    performing tiling projection in a first area and a second area of a projection surface by projecting image light beams in the first area by a first projector and a first projector group including one or more projectors, and projecting image light beams in the second area by a second projector group including two or more projectors;

selecting either one of first processing of adjusting luminance of a light source of the first projector group in two or more times in a first period based on at least one of a luminance variation of an input image and peripheral luminance of the projection surface and second processing of adjusting the luminance of the light source of the first projector group at a time in a second period shorter than the first period when projection by the first projector stops;

deciding a first adjustment amount of adjusting output of the light source of the first projector group so that luminance of the first area in which the image light beams of the first projector group are projected coincides with luminance of the second area in which the image light beams of the second projector group are projected when the projection by the first projector stops;

performing first adjustment processing of applying a second adjustment amount smaller than the first adjustment amount to the first projector group when the first processing is selected;

projecting, by the first projector group, the image light beams after performing the first adjustment processing;

performing second adjustment processing of applying a third adjustment amount which is no larger than a difference between the first adjustment amount and the second adjustment amount to the first projector group after the projecting the image light beams by the first projector group; and projecting, by the first projector group, the image light beams after performing the second adjustment processing.

2. The method of controlling the projector according to claim 1, further comprising:

deciding a fourth adjustment amount of adjusting output of a light source of the second projector group when the first processing is selected, wherein the first processing includes applying a fifth adjustment amount smaller than the fourth adjustment amount to the second projector group, projecting, by the second projector group, the image light beams after applying the fifth adjustment amount to the second projector group, applying a sixth adjustment amount which is no larger than a difference between the fourth adjustment amount and the fifth adjustment amount to the second projector group, and projecting, by the second projector group, the image light beams after applying the sixth adjustment amount to the second projector group.

3. The method of controlling the projector according to claim 2, wherein the first processing includes applying the second adjustment amount to the first projector group at a first time point in the first period, projecting, by the first projector group, the image light beams after applying the second adjustment amount to the first projector group, applying the fifth adjustment amount to the second projector group at the first time point, projecting, by the second projector group, the image light beams after applying the fifth adjustment amount to the second projector group, applying the third adjustment amount to the first projector group at a second time point subsequent to the first time point in the first period, projecting, by the first projector group, the image light beams after applying the third adjustment amount to the first projector group, applying the sixth adjustment amount to the second projector group at the second time point, and projecting, by the second projector group, the image light beams after applying the sixth adjustment amount to the second projector group.

4. The method of controlling the projector according to claim 1, further comprising:

applying the first adjustment amount to the first projector group when the second processing is selected; and projecting, by the first projector group, the image light beams after applying the first adjustment amount to the first projector group.

5. The method of controlling the projector according to claim 1, further comprising:

deciding a fourth adjustment amount of adjusting output of alight source of the second projector group when the second processing is selected, wherein the second processing includes applying the first adjustment amount to the first projector group in the second period, projecting, by the first projector group, the image light beams after applying the first adjustment amount to the first projector group, applying the fourth adjustment amount to the second projector group in the second period, and projecting, by the second projector group, the image light beams after applying the fourth adjustment amount to the second projector group.

6. The method of controlling the projector according to claim 5, wherein the deciding the fourth adjustment amount includes deciding the fourth adjustment amount so that the luminance of the second area when the second projector group projects the image light beams after applying the fourth adjustment amount to the second projector group coincides with the luminance of the first area when the first projector group projects the image light beams after applying the first adjustment amount to the first projector group.

7. The method of controlling the projector according to claim 1, wherein the selecting either one of the first processing and the second processing includes selecting the first processing when a difference between an average pixel value of a first frame of an input image input to the first projector group and an average pixel value of a second frame prior to the first frame when the projection by the first projector stops is lower than a first threshold value, and selecting the second processing when the difference between the average pixel value of the first frame and the average pixel value of the second frame when the projection by the first projector stops is no lower than the first threshold value.

8. The method of controlling the projector according to claim 1, wherein the selecting either one of the first processing and the second processing includes selecting the first processing when peripheral luminance of the projection surface when the projection by the first projector stops is lower than a second threshold value, and selecting the second processing when the peripheral luminance of the projection surface when the projection by the first projector stops is no lower than the second threshold value.

9. A non-transitory computer-readable storage medium storing a program configured to make a processor of a projector execute processing comprising:

performing tiling projection in a first area and a second area of a projection surface by projecting image light beams in the first area by a first projector and a first projector group including one or more projectors, and projecting image light beams in the second area by a second projector group including two or more projectors;

selecting either one of first processing of adjusting luminance of a light source of the first projector group in two or more times in a first period based on at least one of a luminance variation of an input image and peripheral luminance of the projection surface and second processing of adjusting the luminance of the light source of the first projector group at a time in a second period shorter than the first period when projection by the first projector stops;

deciding a first adjustment amount of adjusting output of the light source of the first projector group so that luminance of the first area in which the image light beams of the first projector group are projected coincides with luminance of the second area in which the image light beams of the second projector group are projected when the projection by the first projector stops;

performing first adjustment processing of applying a second adjustment amount smaller than the first adjustment amount to the first projector group when the first processing is selected;

projecting, by the first projector group, the image light beams after performing the first adjustment processing;

performing second adjustment processing of applying a third adjustment amount which is no larger than a difference between the first adjustment amount and the second adjustment amount to the first projector group after the projecting the image light beams by the first projector group; and projecting, by the first projector group, the image light beams after performing the second adjustment processing.

10. A projector comprising:
a light source;
a memory; and
at least one processor, wherein
the at least one processor is configured to execute
performing tiling projection in a first area and a second area of a projection surface by projecting image light beams in the first area by a first projector and a first projector group including one or more projectors, and projecting image light beams in the second area by a second projector group including two or more projectors,
selecting either one of first processing of adjusting luminance of a light source of the first projector group in two or more times in a first period based on at least one of a luminance variation of an input image and peripheral luminance of the projection surface and second processing of adjusting the luminance of the light source of the first projector group at a time in a second period shorter than the first period when projection by the first projector stops,
deciding a first adjustment amount of adjusting output of the light source of the first projector group so that luminance of the first area in which the image light beams of the first projector group are projected coincides with luminance of the second area in which the image light beams of the second projector group are projected when the projection by the first projector stops,
performing first adjustment processing of applying a second adjustment amount smaller than the first adjustment amount to the first projector group when the first processing is selected,
projecting, by the first projector group, the image light beams after performing the first adjustment processing,
performing second adjustment processing of applying a third adjustment amount which is no larger than a difference between the first adjustment amount and the second adjustment amount to the first projector group after the projecting the image light beams by the first projector group, and
projecting, by the first projector group, the image light beams after performing the second adjustment processing, and
the projector is included in either one of the first projector group and the second projector group.

* * * * *